US011319069B1

(12) United States Patent
Lim et al.

(10) Patent No.: US 11,319,069 B1
(45) Date of Patent: May 3, 2022

(54) METHOD AND APPARATUS FOR HANDLING GOODS BY A GROUP OF COLLABORATING UNMANNED AERIAL VEHICLES

(71) Applicants: PABLO AIR Co., Ltd., Incheon (KR); PABLO AIR International, INC., Phoenix, AZ (US)

(72) Inventors: Seung Han Lim, Daejeon (KR); Youngjoon Kim, Incheon (KR); Dong Jin Lee, Chungcheongnam-do (KR)

(73) Assignees: PABLO AIR Co., Ltd., Incheon (KR); PABLO AIR International, INC., Phoenix, AZ (US)

( * ) Notice: Subject to any disclaimer, the term of this patent is extended or adjusted under 35 U.S.C. 154(b) by 0 days.

(21) Appl. No.: 17/519,529

(22) Filed: Nov. 4, 2021

(30) Foreign Application Priority Data

Mar. 19, 2021 (KR) ........................ 10-2021-0036061

(51) Int. Cl.
| | |
|---|---|
| *B64C 39/02* | (2006.01) |
| *G08G 5/00* | (2006.01) |
| *G05D 1/10* | (2006.01) |
| *G06Q 10/08* | (2012.01) |

(52) U.S. Cl.
CPC ........... *B64C 39/024* (2013.01); *G05D 1/104* (2013.01); *G05D 1/106* (2019.05); *G06Q 10/083* (2013.01); *G08G 5/0008* (2013.01); *B64C 2201/027* (2013.01); *B64C 2201/128* (2013.01); *B64C 2201/143* (2013.01)

(58) Field of Classification Search
CPC .................................................. G08G 5/0008
See application file for complete search history.

(56) References Cited

U.S. PATENT DOCUMENTS

| | | | | |
|---|---|---|---|---|
| 9,022,324 | B1* | 5/2015 | Abhyanker | B64C 39/024 244/189 |
| 10,013,884 | B2* | 7/2018 | DeLuca | G08G 5/0017 |
| 2010/0049376 | A1* | 2/2010 | Schultz | G01S 5/0072 701/2 |
| 2015/0120126 | A1* | 4/2015 | So | G01C 23/00 701/26 |
| 2015/0251756 | A1* | 9/2015 | Perez Villar | G08G 5/0021 701/4 |
| 2015/0327136 | A1* | 11/2015 | Kim | H04L 67/12 370/331 |
| 2017/0069214 | A1* | 3/2017 | Dupray | G08G 5/0013 |
| 2018/0137454 | A1* | 5/2018 | Kulkarni | G08G 5/0021 |

(Continued)

FOREIGN PATENT DOCUMENTS

| | | |
|---|---|---|
| JP | 2020-074133 A | 5/2020 |
| KR | 10-1475629 B1 | 12/2014 |

(Continued)

*Primary Examiner* — Thomas Randazzo
(74) *Attorney, Agent, or Firm* — Studebaker & Brackett PC

(57) ABSTRACT

Provided is a method for delivering goods through an unmanned aerial vehicle group including a plurality of aircraft respectively connected to delivery target goods. The method comprises identifying, by a master aircraft of the unmanned aerial vehicle group, an actual load applied to each of the aircraft by the goods while the unmanned aerial vehicle group is flying to deliver the goods, and controlling the unmanned aerial vehicle group by the master aircraft to adjust the actual load applied to each of the aircraft.

17 Claims, 28 Drawing Sheets

(56) References Cited

U.S. PATENT DOCUMENTS

| | | | |
|---|---|---|---|
| 2018/0188724 A1* | 7/2018 | Jassowski | G05D 1/0027 |
| 2019/0118944 A1* | 4/2019 | Kimchi | G05D 1/104 |
| 2020/0233411 A1* | 7/2020 | Ivanov | G05D 1/0022 |
| 2020/0288895 A1* | 9/2020 | Bennet | H04W 12/08 |
| 2021/0269151 A1* | 9/2021 | Bartz | A62C 4/00 |
| 2021/0300553 A1* | 9/2021 | Exner | B64C 39/024 |
| 2021/0300554 A1* | 9/2021 | Bergkvist | B64C 39/024 |

FOREIGN PATENT DOCUMENTS

| | | |
|---|---|---|
| KR | 10-1658471 B1 | 9/2016 |
| KR | 10-1901648 B1 | 9/2018 |
| KR | 10-2018-0128703 A | 12/2018 |
| KR | 10-2019-0014418 A | 2/2019 |
| KR | 10-2106893 B1 | 5/2020 |
| KR | 10-2171113 B1 | 10/2020 |
| KR | 10-2182912 B1 | 11/2020 |

* cited by examiner

METHOD AND APPARATUS FOR HANDLING GOODS BY A GROUP OF COLLABORATING UNMANNED AERIAL VEHICLES

This application claims the benefit of Korean Patent Application No. 10-2021-0036061, filed on Mar. 19, 2021, in the Korean Intellectual Property Office, the disclosure of which is incorporated herein by reference in its entirety.

BACKGROUND

1. Field

The present disclosure relates to a method and apparatus for delivering goods through collaboration of a group of a plurality of unmanned aerial vehicles. More particularly, it relates to a method and an apparatus for a plurality of unmanned aerial vehicles to collaborate to jointly deliver single goods.

2. Description of the Related Art

An unmanned aerial vehicle or drone is an aerial vehicle that automatically flies according to a pre-programmed route or under automatic control of a control center without a pilot directly boarding the aerial vehicle. In the early days, unmanned aerial vehicles or drones were mainly used for military purposes such as surveillance and reconnaissance, but recently their use in various civilian fields is increasing.

Today, unmanned aerial vehicles such as drones are being used in various fields. For example, unmanned aerial vehicles are being used in the fields of agriculture, broadcasting, film photographing, and entertainment including air shows.

Furthermore, a technology for delivering goods using an unmanned aerial vehicle is currently being developed. After Amazon tested a drone delivery service in 2015, various entities in many countries are continuing research to make delivery using drones a reality. Research is being conducted on a service that delivers goods to a designated place with an unmanned aerial vehicle loaded with goods. Using such an unmanned aerial vehicle for delivery not only saves labor costs, but also delivers goods faster than conventional transportation methods to areas where vehicles are difficult to move, such as mountainous areas and islands. It can also quickly deliver blood, medicines, etc. in emergency situations.

The flying range of the unmanned aerial vehicle that can be used to deliver goods and the load that the unmanned aerial vehicle can load are affected by the hardware specifications of the unmanned aerial vehicle. Therefore, in order to deliver larger and heavier goods, it may be considered to increase the size and thrust of the unmanned aerial vehicle.

However, increasing the size of the unmanned aerial vehicle is accompanied by various problems. For example, as the size of the unmanned aerial vehicle increases, the development cost rapidly increases, and the cost of securing the infrastructure for the operation of the unmanned aerial vehicle and the maintenance cost of the unmanned aerial vehicle also increases significantly. On the other hand, when a large unmanned aerial vehicle flies in a densely populated area such as a city center, civil complaints are expected due to noise, etc., and if a large unmanned aerial vehicle crashes, great damage can occur.

Therefore, instead of a single large unmanned aerial vehicle, a technology, in which a plurality of small unmanned aerial vehicles collaborate to jointly transport single goods, may be considered. In other words, rather than increasing the size of the unmanned aerial vehicle, a technology to increase the number of the unmanned aerial vehicle's aircraft and control them so that they can collaborate may be provided.

However, it is expected that various issues will occur even when a large number of small unmanned aerial vehicle groups are actually put into transport of goods. The small unmanned aerial vehicle mainly flies at an altitude of about 150 meters, so the range of the route is very limited compared to the general aircraft. Therefore, as the number of aircraft of the unmanned aerial vehicle increases, there is a risk that many aircraft will be concentrated on the route. In other words, there is a risk that the density or saturation of routes available for unmanned aerial vehicles may increase excessively.

Also, as the number of aircraft of the unmanned aerial vehicles increases, the burden on the control center to centrally coordinate and control their flight greatly increases. This causes an increase in hardware performance and scale of the control device on the control center side, and an increase in the number of people to manage it.

Therefore, there is a need for a method to minimize the increase in the control burden of the control center while being possible to transport heavy goods using a small unmanned aerial vehicle as much as possible.

SUMMARY

A technical problem to be solved by the present disclosure is to provide a method and an apparatus for delivering goods through collaboration of a group of a plurality of unmanned aerial vehicles.

Another technical problem to be solved by the present disclosure is to provide a method for forming a group consisting of a plurality of unmanned aerial vehicles that will collaborate and jointly deliver goods.

Another technical problem to be solved by the present disclosure is to provide a method for enabling an unmanned aerial vehicle group to perform a flight starting procedure for goods delivery while minimizing the communication and handing load of a control device.

Another technical problem to be solved by the present disclosure is to provide a method for controlling the flight of the aircraft included in the unmanned aerial vehicle group to maintain a movement route according to the delivery plan being performed by the unmanned aerial vehicle group while minimizing the communication and handling load of the control device.

Another technical problem to be solved by the present disclosure is to provide a method for controlling the flight of the aircraft included in the unmanned aerial vehicle group based on the state (position, acceleration, posture, etc.) of the goods delivered by the unmanned aerial vehicle group.

Another technical problem to be solved by the present disclosure is to provide a method for controlling the flight of the aircraft included in the unmanned aerial vehicle group so that the goods delivered by the unmanned aerial vehicle group are transported while being maintained on the movement route according to the delivery plan Another technical problem to be solved by the present disclosure is to provide a method for controlling the flight of the aircraft included in the unmanned aerial vehicle group so that the load by the delivery target loaded goods is properly distributed and maintained to the aircraft included in the unmanned aerial vehicle group.

Another technical problem to be solved by the present disclosure is to provide a method for controlling the flight of the aircraft included in the unmanned aerial vehicle group so that the load applied to each aircraft included in the unmanned aerial vehicle group is properly distributed and maintained in response to external factors that occur while the unmanned aerial vehicle group is flying to transport the delivery target loaded goods.

The technical problems of the present disclosure are not limited to the technical problems mentioned above, and other technical problems not mentioned will be clearly understood by those skilled in the art from the following description.

According to an embodiment, a method for delivering goods through an unmanned aerial vehicle group including a plurality of aircraft respectively connected to delivery target goods may include identifying, by a master aircraft of the unmanned aerial vehicle group, an actual load applied to each of the aircraft by the goods while the unmanned aerial vehicle group is in flight for delivering the goods, and controlling the unmanned aerial vehicle group by the master aircraft to adjust the actual load applied to each of the aircraft.

According to an embodiment, the method further may include obtaining a target load associated with each aircraft included in the unmanned aerial vehicle group by the master aircraft of the unmanned aerial vehicle group before the unmanned aerial vehicle group initiates the flight for delivering the goods, wherein the target load associated with each of the aircraft may be determined based on weight of the delivery target goods and thrust performance of each of the aircraft.

According to an embodiment, the method further may include receiving battery level information from each aircraft included in the unmanned aerial vehicle group by the master aircraft, and adjusting a target load associated with at least one aircraft included in the unmanned aerial vehicle group based on the battery level information by the master aircraft.

According to an embodiment, the method further may include receiving battery level information from each aircraft included in the unmanned aerial vehicle group by the master aircraft, and adjusting a vertical arrangement of at least one aircraft included in the unmanned aerial vehicle group based on the battery level information by the master aircraft.

According to an embodiment, the method further may include receiving battery level information from each aircraft included in the unmanned aerial vehicle group by the master aircraft, and adjusting a horizontal arrangement of at least one aircraft included in the unmanned aerial vehicle group based on the battery level information by the master aircraft.

According to an embodiment, wherein controlling the unmanned aerial vehicle group by the master aircraft to adjust the actual load applied to each of the aircraft may include, transmitting a control signal for decreasing an altitude of a first aircraft to the first aircraft by the master aircraft, wherein the first aircraft is an aircraft, in which an actual load applied by the goods exceeds a target load while the unmanned aerial vehicle group is flying to deliver the goods.

According to an embodiment, wherein controlling the unmanned aerial vehicle group by the master aircraft to adjust the actual load applied to each of the aircraft may include, transmitting a control signal for increasing an altitude of a second aircraft to the second aircraft by the master aircraft, wherein the second aircraft is an aircraft to which an actual load applied by the goods is less than a target load during the flight for delivering the goods.

According to another embodiment, an unmanned aerial vehicle may include a thrust generating unit for generating thrust to enable flight of an unmanned aerial vehicle, a load measuring unit for measuring a load applied by a goods loading device transported by the unmanned aerial vehicle, a wireless communication unit for forming a wireless session with other unmanned aerial vehicles included in an unmanned aerial vehicle group, and a control unit, wherein the control unit acquires a target load associated with each aircraft included in the unmanned aerial vehicle group, receives information on an actual load applied to each of the aircraft by the loading device through the wireless communication unit, and controls the unmanned aerial vehicle group so that a difference between an actual load applied to each of the aircraft and a target load of each of the aircraft is less than or equal to a threshold.

BRIEF DESCRIPTION OF THE DRAWINGS

These and/or other aspects will become apparent and more readily appreciated from the following description of the embodiments, taken in conjunction with the accompanying drawings in which.

DETAILED DESCRIPTION

Hereinafter, embodiments of the present disclosure will be described with reference to the attached drawings.

Advantages and features of the present disclosure and methods of accomplishing the same may be understood more readily by reference to the following detailed description of embodiments and the accompanying drawings. The present disclosure may, however, be embodied in many different forms and should not be construed as being limited to the embodiments set forth herein. Rather, these embodiments are provided so that this disclosure will be thorough and complete and will fully convey the concept of the disclosure to those skilled in the art, and the present disclosure will only be defined by the appended claims.

Unless otherwise defined, all terms used in the present specification (including technical and scientific terms) may be used in a sense that can be commonly understood by those skilled in the art. In addition, the terms defined in the commonly used dictionaries are not ideally or excessively interpreted unless they are specifically defined clearly. The terminology used herein is for the purpose of describing particular embodiments only and is not intended to be limiting of the disclosure. In this specification, the singular also includes the plural unless specifically stated otherwise in the phrase.

Hereinafter, some embodiments of the present disclosure will be described in detail with reference to the accompanying drawings.

Figure 1:
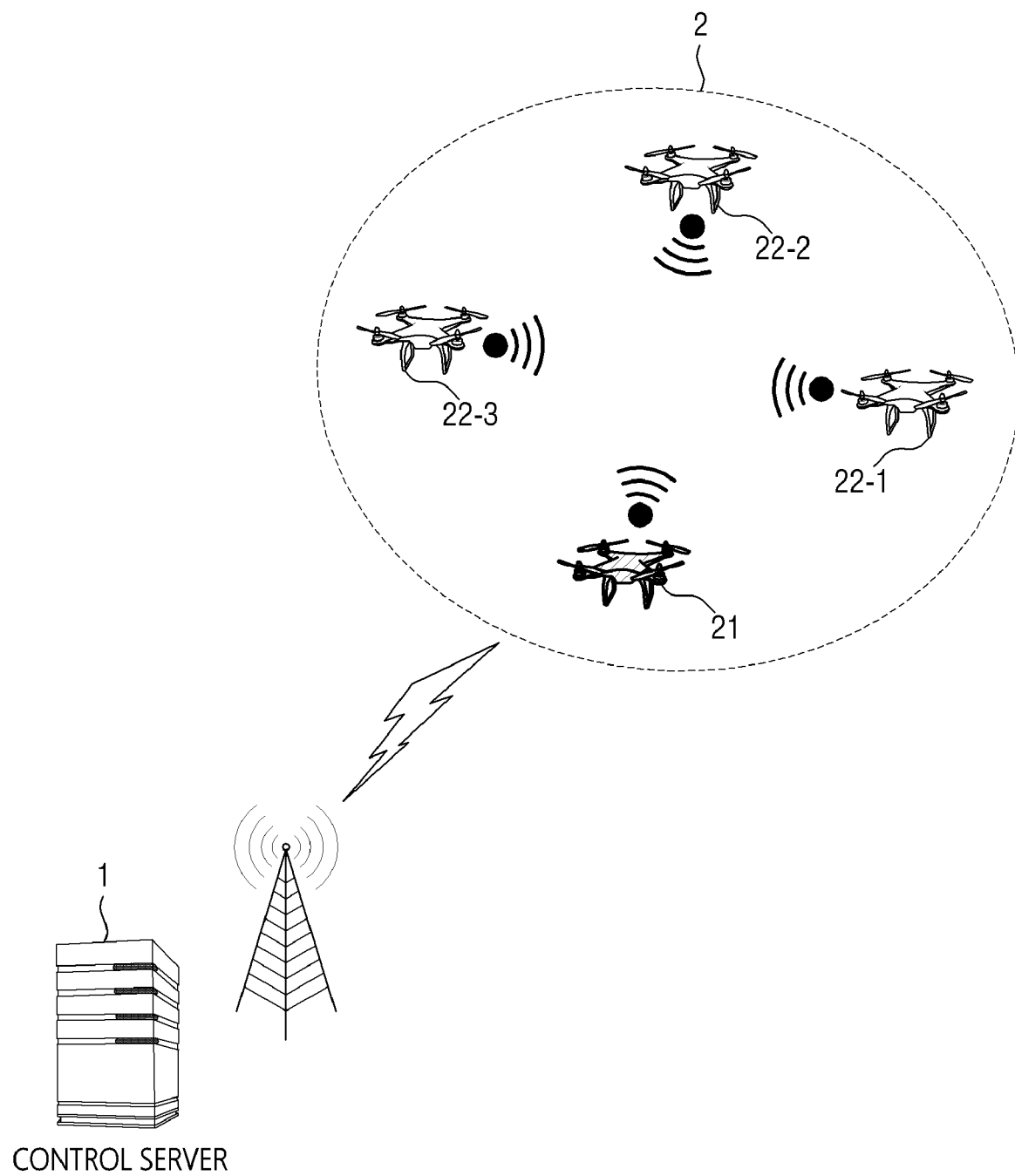
FIG. 1 is a diagram showing the configuration of a delivery system according to an embodiment of the present disclosure.
Figure 2:
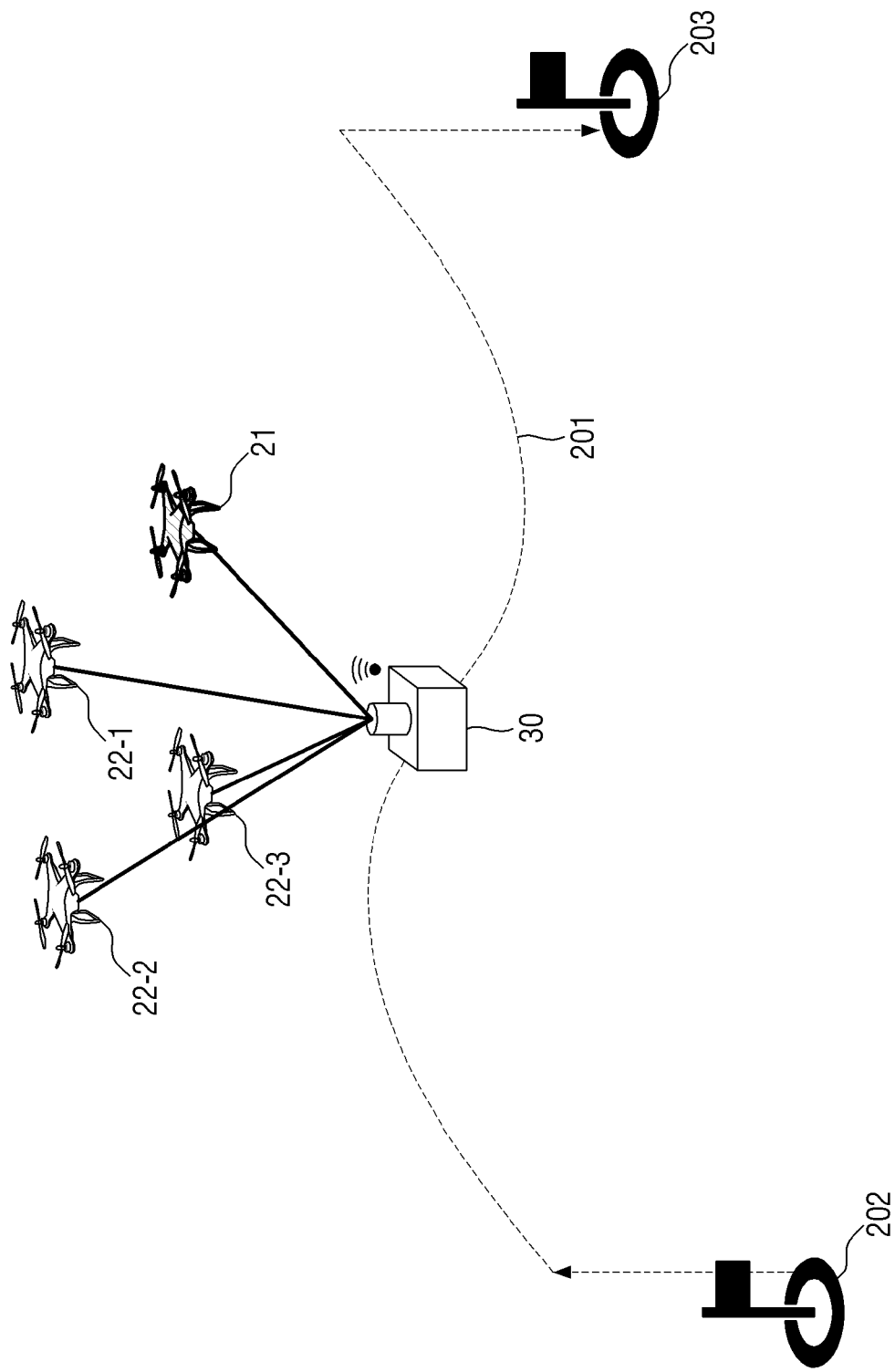
FIG. 2 is a diagram illustrating an exemplary view of transporting goods loaded in a loading device from a departure place to a destination according to some embodiments of the present disclosure.

FIG. 1 is a diagram illustrating the configuration of a delivery system according to an embodiment of the present disclosure, and FIG. 2 is a diagram illustrating an exemplary view of transporting goods loaded in a loading device from a departure place to a destination according to some embodiments of the present disclosure.

As shown in FIG. 1, the delivery system according to an embodiment of the present disclosure may include a control server 1 and an unmanned aerial vehicle group 2. Referring to FIG. 2, in some embodiments, the delivery system may further include a loading device 30 connected to the unmanned aerial vehicle group 2 and towed in the air by the unmanned aerial vehicle group 2. Each of these components may communicate with each other over a network. The network includes a mobile communication network and a wired communication network, and may support communication between the control server 1, the unmanned aerial vehicle group 2, and the loading device 30. In addition, the network may support communication between the respective aircraft 21 and 22-1 to 22-3 included in the unmanned aerial vehicle group 2.

In some embodiments, the unmanned aerial vehicle group 2, the loading device 30 and the control server 1 may be connected by a long-range communication network (e.g., mobile communication network such as 3G, LTE, 5G, etc.), and the unmanned aerial vehicles belonging to the unmanned aerial vehicle group 2 may be connected by a short-range communication network (e.g., WiFi, Bluetooth, UWB, etc.), and the unmanned aerial vehicle belonging to the unmanned aerial vehicle group 2 and the loading device 30 may be connected by a short-range communication network or wired communication network.

The control server 1 is a server that controls the unmanned aerial vehicle group 2 that delivers goods, and the control server 1 may provide first information about movement, such as a departure place, a destination, and a movement route, and second information about the weight and size, shape, price of the delivery target goods, and whether or not it corresponds to handling precautions to the unmanned aerial vehicle group 2. In addition, the control server 1 may receive the position information from the unmanned aerial vehicle group 2 and/or the loading device 30 to monitor whether the unmanned aerial vehicle group 2 is moving on a designated route. In addition, the control server 1 may receive information on the fastening state between the unmanned aerial vehicle group 2 and the loading device 30 and the load applied by the fastening from the unmanned aerial vehicle group 2 and/or the loading device 30 to monitor whether the unmanned aerial vehicle group 2 is normally transporting the delivery target goods.

The unmanned aerial vehicle group 2, with the support of the control server 1, may be connected to the loading device, in which the delivery target goods are loaded, at the departure place 202, start flying, fly along the movement route 201, and unload the delivery target goods after reaching the destination 203.

As shown in FIG. 2, the unmanned aerial vehicle (master aircraft and slave aircraft) included in the unmanned aerial vehicle group 2 is a flying device that automatically transports a delivery target goods, and includes one or more thrust generating means such as a propeller, and can fly in the air using the thrust generating means.

As shown in FIG. 2, each unmanned aerial vehicle may be provided with a loading device fastening unit, and is connected to the loading device 30 through a connecting member such as a cable, and can tow jointly the loading device 30, in which the delivery target goods are loaded, in the air.

Each unmanned aerial vehicle may include a satellite signal receiving unit that receives a number of satellite signals (a.k.a. GPS signals) used for GNSS (Global Navigation Satellite System) based position measurement, and a sensing unit including sensors for measuring the acceleration, angular velocity, and posture (roll, pitch, yaw) of the unmanned aerial vehicle and the load applied to the loading device fastening unit by the loading device. The unmanned aerial vehicle may transmit information detected by the satellite signal receiving unit and the sensing unit to another unmanned aerial vehicle or the control server 1, or may control its own flight based on the detected information.

Each unmanned aerial vehicle is provided with a wireless communication unit, through which it can communicate with another unmanned aerial vehicle, the loading device 30, and/or the control server 1. In some embodiments, each unmanned aerial vehicle may have a first communication module for long-range communication and a second communication module for short-range communication.

The unmanned aerial vehicle group 2 may be configured to include two or more unmanned aerial vehicles. At least one of the unmanned aerial vehicles included in the unmanned aerial vehicle group 2 may serve as the master aircraft 21, and the rest of the unmanned aerial vehicles included in the unmanned aerial vehicle group 2 may serve as the slave aircraft 22-1 to 22-3 (hereinafter, referred to as reference number 22). The master aircraft 21 and the slave aircraft 22 included in the unmanned aerial vehicle group 2 may collaborate with each other to participate in jointly transporting the delivery target goods from the departure place to the destination.

Here, the master aircraft 21 and the slave aircraft 22 may have a difference in whether they receive a control signal from the control server 1 while flying together for goods delivery. During the flight for goods delivery, the master aircraft 21 may be configured to receive and process a control signal from the control server 1, and provide a control signal according to the processing result to the slave aircraft 22 to control the slave aircraft 22. During the flight for goods delivery, the slave aircraft 22 may be configured to receive only the control signal of the master aircraft 21 without receiving the control signal from the control server 1. In some embodiments, the master aircraft 21 and the slave aircraft 22 may transmit information about their flight state to the control server 1 while flying together for goods delivery.

The loading device 30 may be an apparatus having a loading box capable of loading a delivery target goods therein.

The loading device 30 may have an unmanned aerial vehicle fastening unit, and may be connected to one or more unmanned aerial vehicles through a connecting member such as a cable detachable from the fastening unit, and may be transported in the air by the thrust and traction of the unmanned aerial vehicle.

The loading device 30 may include a satellite signal receiving unit for receiving a signal used for location measurement based on a GNSS (Global Navigation Satellite System). In addition, the loading device 30 may include a sensing unit including a sensor for measuring its own acceleration, angular velocity, posture (roll, pitch, yaw), etc. and a sensor for detecting the load respectively applied to unmanned aerial vehicle fastening unit connected to each of the unmanned aerial vehicles.

The loading device 30 has a wireless communication unit or a wired communication unit, and may transmit information detected by the satellite signal receiving unit and the sensing unit to the unmanned aerial vehicle or the control server 1 through the wireless/wired communication unit. In some embodiments, the loading device 30 may include a first communication module for long-range communication and a second communication module for short-range communication.

According to this embodiment, the unmanned aerial vehicle group 2 comprising at least one master aircraft 21 and the slave aircraft 22 may collaborate with each other to transport single delivery target goods from the departure place 202 to the destination 203. According to the present embodiment, since a plurality of unmanned aerial vehicles form a group and collaborate with each other to transport single goods, it is possible to transport goods of greater weight than when one unmanned aerial vehicle transports goods alone. In addition, according to this embodiment, since a number of unmanned aerial vehicles form a group and transport single goods, various issues that may occur when operating a large unmanned aerial vehicle capable of transporting high-weight goods alone, for example, development and operation costs of a large unmanned aerial vehicle, excessive noise, and concerns about damage in the event of an accident, can be reduced. In addition, according to this embodiment, once the flight for delivery of goods is started, since it is sufficient that the control server 1 does not need to transmit a control signal to the slave aircraft 22 among the unmanned aerial vehicle group 2, but transmits a control signal to only the master aircraft 21, communication traffic for centrally coordinating and controlling a large number of unmanned aerial vehicles is reduced, and the demand for additional hardware or manpower required for control can be reduced.

Hereinafter, a goods delivery method that can be performed by the unmanned aerial vehicle group 2 included in the delivery system will be described with reference to FIG. 3.

Figure 3:
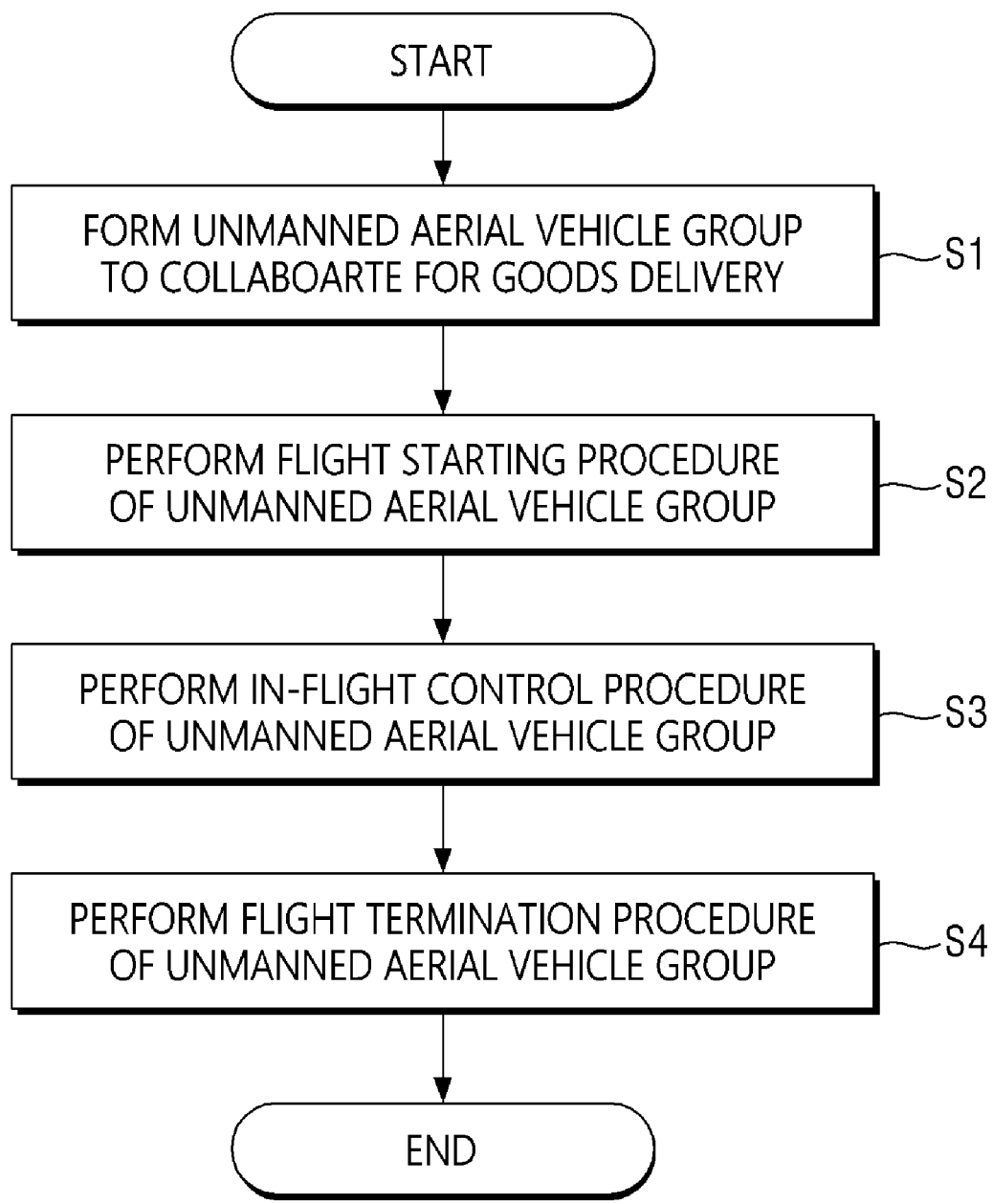
FIG. 3 is a flowchart of a method of delivering goods through a collaborating unmanned aerial vehicle group according to some embodiments of the present disclosure.

FIG. 3 is a flowchart of a method of delivering goods through a collaborating unmanned aerial vehicle group 2 according to some embodiments of the present disclosure.

Referring to FIG. 3, first, in step S1, an unmanned aerial vehicle group 2 to collaborate for delivery of goods may be formed.

Two or more unmanned aerial vehicles suitable for the departure place, destination, and movement route of the delivery target goods, and the weight, size and shape of the delivery target goods may be selected and configured as the unmanned aerial vehicle group 2 to participate in the delivery. The unmanned aerial vehicle group 2 may be configured to include at least one master aircraft 21 and a slave aircraft 22. The formation of the unmanned aerial vehicle group 2 will be described later in more detail with reference to FIGS. 4 to 11.

Subsequently, in step S2, the flight staring procedure of the unmanned aerial vehicle group 2 may be performed.

The flight starting procedure of the unmanned aerial vehicle group 2 may involve signal exchange between the control server 1, the master aircraft 21, the slave aircraft 22, and the loading device 30. The signal may indicate the state of each aircraft 21, 22 or loading device 30, or may include a command to be issued to each aircraft or device.

The flight starting procedure of the unmanned aerial vehicle group 2 may include switching of the operation mode of the master aircraft 21 and the slave aircraft 22. For example, during a flight staring procedure, the master aircraft 21 may be switched from a standalone mode to a master mode for controlling a slave aircraft. Also, during the flight starting procedure, the slave aircraft 22 may be switched from a standalone mode to a slave mode under the control of the master aircraft. The slave aircraft 22 switched to the slave mode belongs to at least the unmanned aerial vehicle group 2 and may be configured to be controlled by the master aircraft 21 without being controlled by the control server 1 during the flight to deliver the goods.

The execution of the flight starting procedure of the unmanned aerial vehicle group 2 will be described later in more detail with reference to FIGS. 12 to 15.

Subsequently, in step S3, the flight of the unmanned aerial vehicle group 2 may be started and an in-flight control procedure may be performed.

The in-flight control procedure may include, for example, an operation of adjusting the position of the loading device 30, the position of the unmanned aerial vehicle group 2, the positions of the master aircraft 21 and each of the slave aircraft 22-1 to 22-3 included in the unmanned aerial vehicle group 2 to match the target position. In other words, the operation of controlling the position of the loading device 30, the position of the unmanned aerial vehicle group 2, and each aircraft included in the unmanned aerial vehicle group 2 to follow the planned movement route may be included in the in-flight control procedure. This will be described later in more detail with reference to FIGS. 16 to 23.

In addition, the in-flight control procedure may include an operation for properly maintaining or adjusting the load applied by the loading device 30 to the respective aircraft. For example, the flight of each aircraft included in the unmanned aerial vehicle group 2 can be controlled so that the target load scheduled to be applied to a specific aircraft included in the unmanned aerial vehicle group 2 by the goods loaded in the loading device 30 and the load applied to the corresponding aircraft at a specific point in time during flight match as much as possible. This will be described later in more detail with reference to FIGS. 24 to 27.

Finally, in step S4, a flight termination procedure may be performed after the unmanned aerial vehicle group 2 reaches the destination 203.

The flight termination procedure of the unmanned aerial vehicle group 2 may involve signal exchange between the control server 1, the master aircraft 21, the slave aircraft 22, and the loading device 30. At least some of the master aircraft 21, the slave aircraft 22, and the loading device 30 may transmit a signal indicating completion of arrival at the destination to the control server 1. In some embodiments, each of the master aircraft 21, the slave aircraft 22, and the loading device 30 transmits the signal to the control server 1, and the control server 1 checks this, so that it can be checked more accurately whether or not the delivery target goods have reached at the destination 203.

The flight termination procedure of the unmanned aerial vehicle group 2 may include switching of the operation mode of the master aircraft 21 and the slave aircraft 22. When the flight is terminated upon arrival at the destination 203, the operation modes of the master aircraft 21 and the slave aircraft 22 may all be switched to a standalone mode, and the unmanned aerial vehicle group 2 may be disbanded. In the standalone mode, each unmanned aerial vehicle can fly autonomously while exchanging control signals with the control server 1.

So far, the overall flow of the method for delivering the goods by the delivery system shown in FIG. 1 has been described with reference to FIG. 3. Hereinafter, a goods delivery method according to some embodiments of the present disclosure will be described in more detail with reference to FIGS. 4 to 27.

First, an embodiment of a method of forming the unmanned aerial vehicle group 2 will be described with reference to FIGS. 4 to 11.

Figure 4:
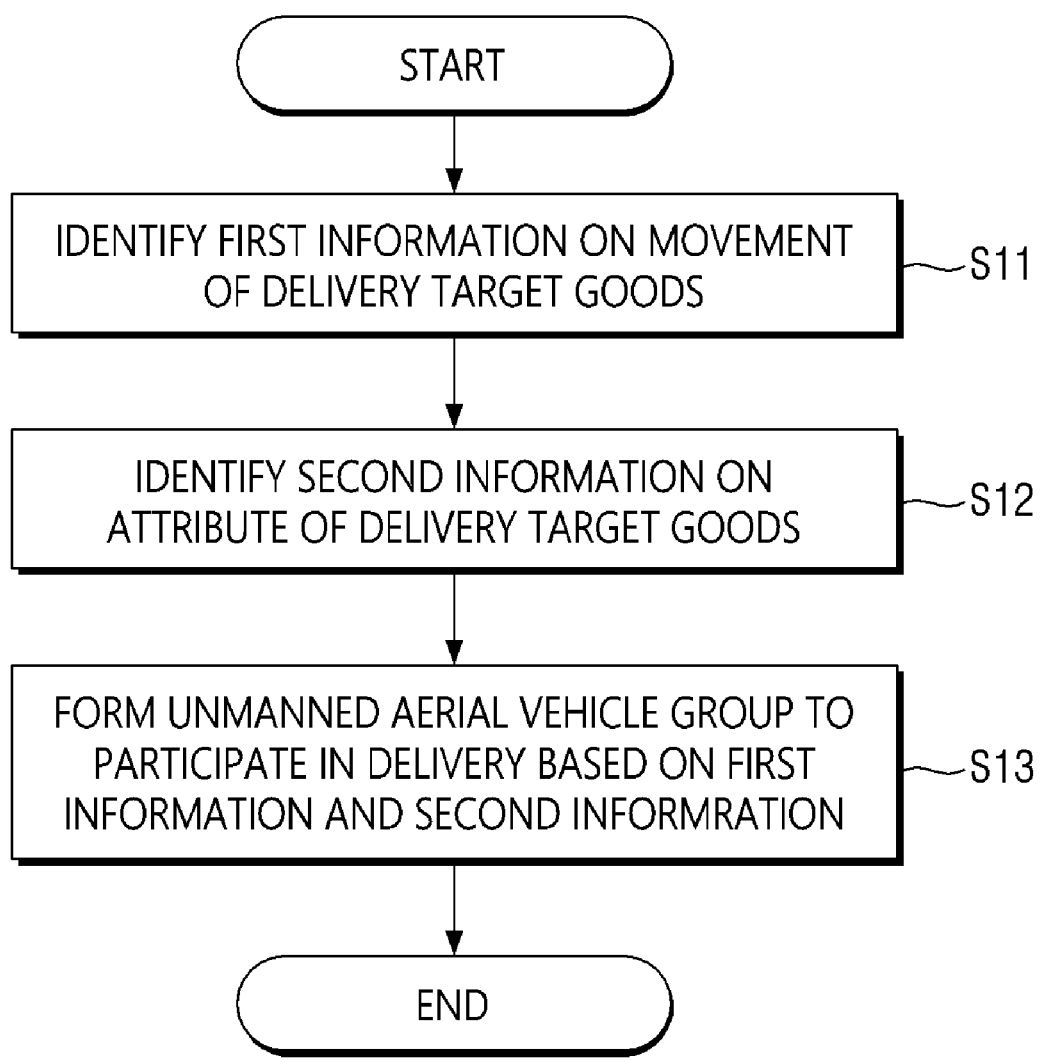
FIG. 4 is a flowchart of a method of delivering goods through a collaborating unmanned aerial vehicle group according to another embodiment of the present disclosure.

FIG. 4 is a flowchart of a method of delivering goods through a collaborating unmanned aerial vehicle group 2 according to an embodiment of the present disclosure. More specifically, an embodiment to be described below with reference to FIG. 4 may be used in a process of forming a group for a plurality of unmanned aerial vehicles to collaborate to deliver goods. From that point of view, the present embodiment may be understood to correspond to step S1 of the embodiment described with reference to FIG. 3, but this is not necessarily the case. The method according to the present embodiment may be performed, for example, by the control server 1, but may also be performed by a device other than the control server 1.

Figure 5:
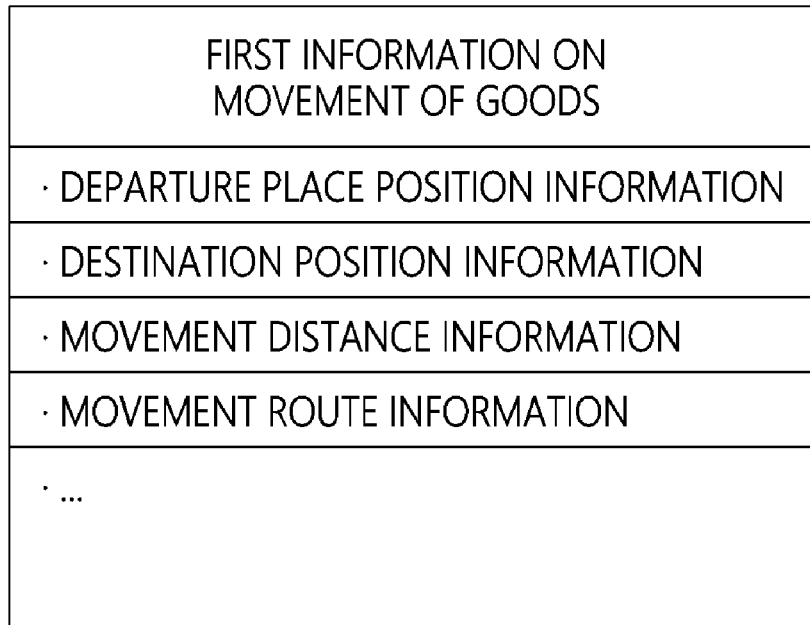
FIGS. 5 and 6 are diagrams for describing the type of information on the movement and attributes of goods referenced in the embodiment described with reference to FIG. 4.

Referring to FIG. 4, first, in step S11, first information on the movement of delivery target goods is identified. The first information on the movement of the delivery target goods may be acquired by the control server 1 from the outside, or information already stored in the control server 1 may be provided by the control server 1 to the unmanned aerial vehicle. FIG. 5 is a diagram illustrating exemplary types of information that may be regarded as the first information. As shown in FIG. 5, the first information may include information about the position of the departure place of the goods delivery, information about the position of the destination of the goods delivery, information about the movement route of the goods delivery process, and information about the movement distance according to the movement route. Here, the information on the position of the departure place and the destination may be expressed in a manner commonly used to indicate the position, such as latitude and longitude according to the global navigation satellite system, or an administrative district name or address.

Figure 6:
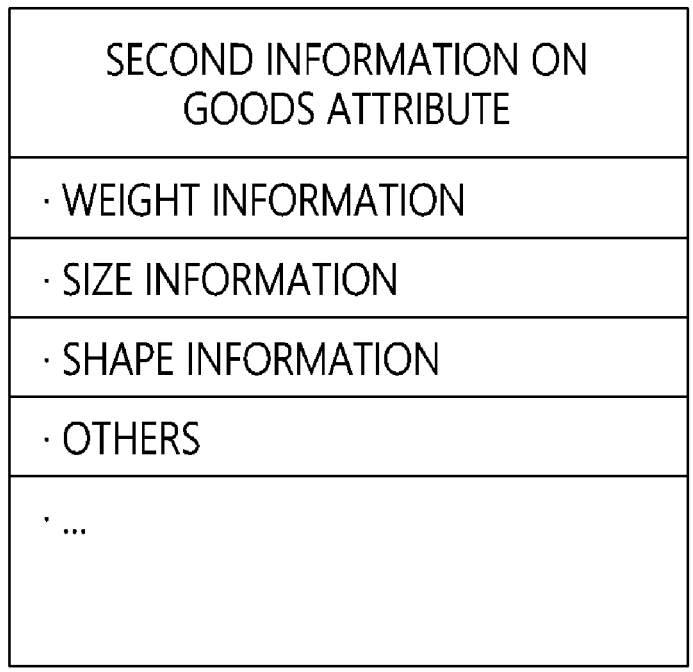

In step S12, second information on the attribute of the delivery target goods is identified. The second information about the attribute of the delivery target goods may be acquired by the control server 1 from the outside, or information already stored in the control server 1 may be provided by the control server 1 to the unmanned aerial vehicle. FIG. 6 is a diagram illustrating exemplary types of information that may be regarded as the second information. As shown in FIG. 6, the second information may include information on the weight of the delivery target goods, the size of the goods (width, depth, etc.), the shape of the goods, the value of the goods, and whether the goods correspond to handling precautions.

Although it is shown in FIG. 4 that step S12 is performed after step S11, embodiments of the present disclosure are not limited to such an order, and there is not limitation for the order of performing steps S11 and S12.

Subsequently, in step S13, based in part on at least a part of the first information and the second information, the unmanned aerial vehicle group 2 to participate in the delivery of the delivery target goods may be formed. Step S13 will be described in more detail with reference to FIGS. 7 to 11.

Figure 7:
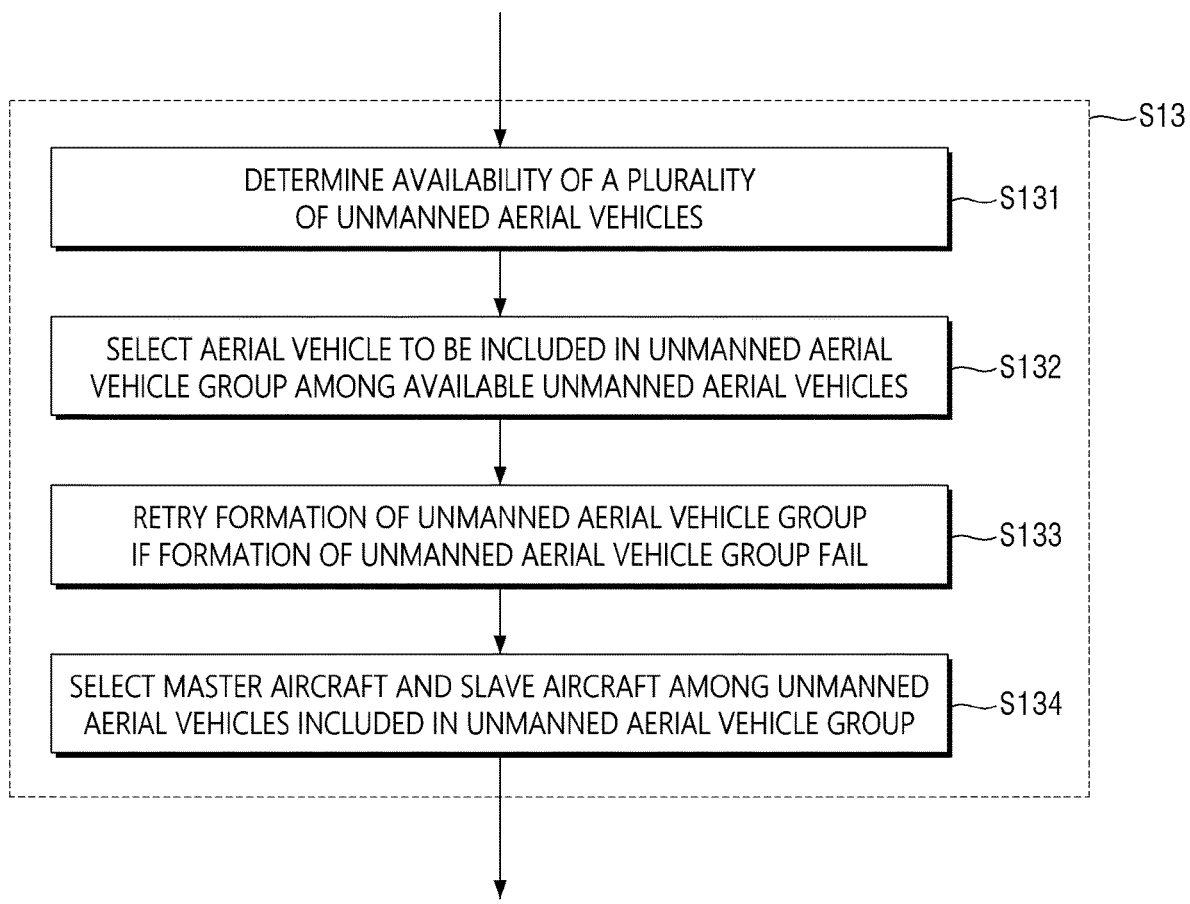
FIG. 7 is a diagram for describing in more detail the step of selecting an unmanned aerial vehicle to participate in delivery among various steps of the method described with reference to FIG. 4.

Referring to FIG. 7, in step S131, the current availability may be determined for the aircraft included in the unmanned aerial vehicle pool previously designated as being able to participate in the joint collaboration delivery, and in step S132, among the current available unmanned aerial vehicles, aerial vehicles to be included in the unmanned aerial vehicle group 2 may be selected, and in step S134, the master aircraft 21 and the slave aircraft 22 may be selected from among the vehicles included in the unmanned aerial vehicle group 2. Here, in step S132, if no aerial vehicles capable of forming the unmanned aerial vehicle group 2 are found among the currently available unmanned aerial vehicles, it may retry to perform the formation of the unmanned aerial vehicle group 2 after taking a predetermined action in step S133.

Figure 8:
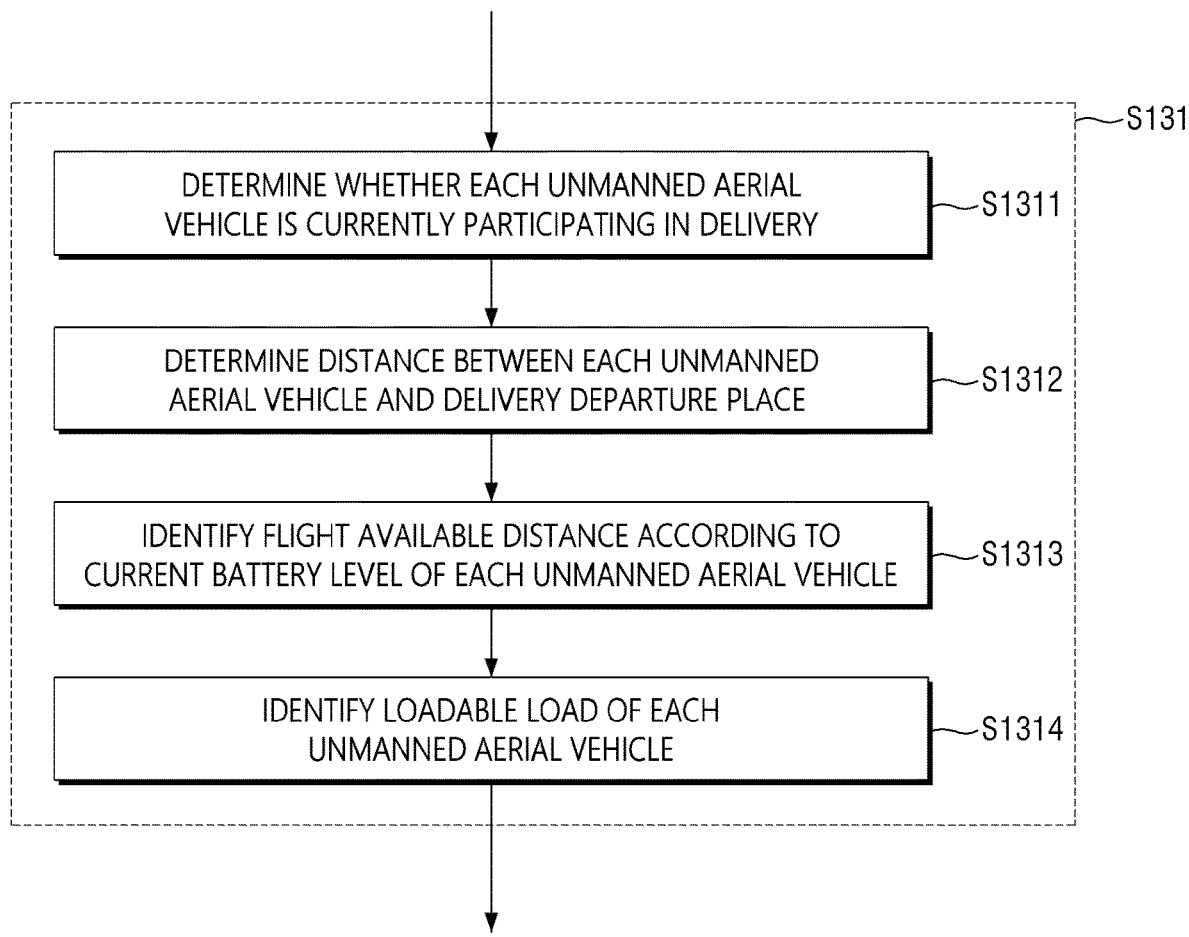
FIG. 8 is a diagram for describing in more detail a step of determining whether a plurality of unmanned aerial vehicles are available among various steps described with reference to FIG. 7.

With reference to FIG. 8, an operation of determining whether or not the aircraft included in the unmanned aerial vehicle pool is currently available will be described in more detail. The steps shown in FIG. 8 may be understood to correspond to the operations performed in step S131 of FIG. 7.

Referring to FIG. 8, in step S1311, it is determined whether each unmanned aerial vehicle included in the unmanned aerial vehicle pool is currently participating in another delivery operation, and the unmanned aerial vehicle currently participating in another delivery operation may be excluded from consideration for the formation of an unmanned aerial vehicle group 2.

In step S1312, the distance between the current position of each unmanned aerial vehicle included in the unmanned aerial vehicle pool and the position of the delivery departure place is determined, and the unmanned aerial vehicle whose distance exceeds a predetermined threshold may be excluded from consideration for the formation of the unmanned aerial vehicle group 2. In other words, unmanned aerial vehicles located too far from the delivery departure place may be excluded from consideration for group formation.

In step S1313, the battery level of each unmanned aerial vehicle included in the unmanned aerial vehicle pool and the flight available distance accordingly may be identified. Each of the unmanned aerial vehicles included in the unmanned aerial vehicle pool may have different hardware specifications, and the battery capacity consumed per unit flight distance may also be different from each other. In step S1313, for example, the control server 1 may receive information about the battery level from each unmanned aerial vehicle and calculates each flight available distance therefrom, or receive the flight available distance from each unmanned aerial vehicle to identify the expected flight available distance in consideration of the battery level of each unmanned aerial vehicle.

Unmanned aerial vehicles whose flight available distance is less than the flight distance required for moving from the delivery departure place to the delivery destination may be excluded from consideration for the formation of the unmanned aerial vehicle group 2.

In step S1314, for each unmanned aerial vehicle included in the unmanned aerial vehicle pool, a loadable load may be identified. The unmanned aerial vehicles included in the unmanned aerial vehicle pool may each have different hardware specifications, and the magnitude of thrust for lifting the loaded goods and the movable time while lifting the loaded goods may be different. Based on these factors, the loadable load of each unmanned aerial vehicle may be different from each other. In step S1314, for example, by the control server 1 receiving information about the loadable load from each unmanned aerial vehicle, the loadable load of each unmanned aerial vehicle may be identified. The loadable load identified for each unmanned aerial vehicle may be used in the process of selecting the aircraft to be included in the unmanned aerial vehicle group 2 in the future.

On the other hand, it should be noted that the above-described operations are not necessarily performed in the order shown in FIG. 8, and steps S1311 to S1314 may be performed in a different order from that shown in FIG. 8 or may be performed substantially simultaneously.

Hereinafter, with reference to FIG. 9, an operation, in which the aerial vehicles to be included in the unmanned aerial vehicle group 2 are selected from among the currently available unmanned aerial vehicles, will be described in more detail. The steps shown in FIG. 9 may be understood to correspond to the operations performed in step S132 of FIG. 7.

Figure 9:
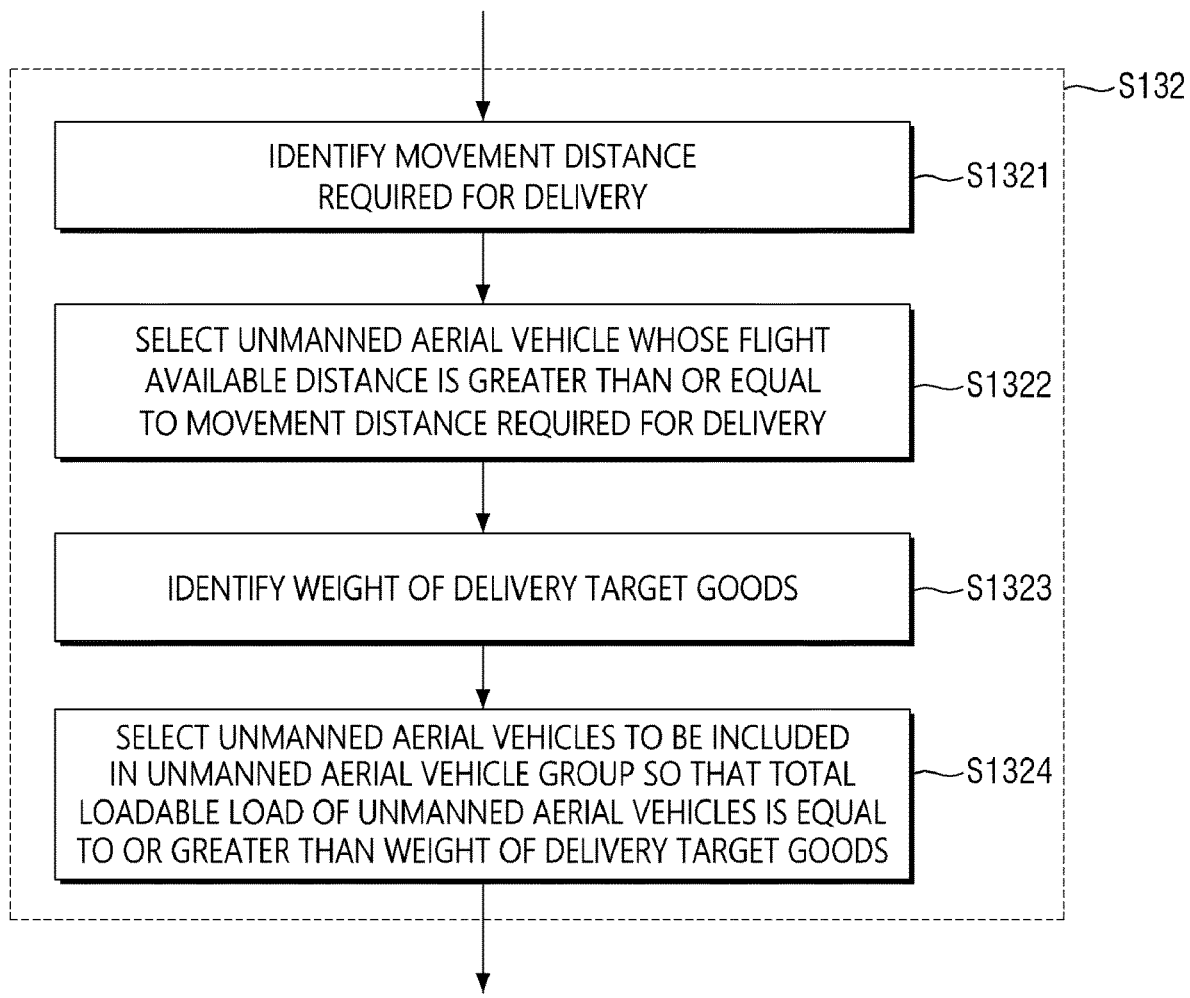
FIG. 9 is a diagram for describing in more detail the step of selecting an unmanned aerial vehicle to be included in a group among available unmanned aerial vehicles among the various steps described with reference to FIG. 7.

Referring to FIG. 9, in step S1321, a movement distance required for delivery of a delivery target goods may be identified. The movement distance may be acquired, for example, from the first information identified in step S11.

In step S1322, based on the flight available distance of each unmanned aerial vehicle identified in the above-described step S1313, unmanned aerial vehicles capable of flying more than the movement distance required for delivery are selected.

In step S1323, the weight of the delivery target goods may be identified. The weight may be acquired, for example, from the second information identified in step S12.

In step S1324, based on the loadable load information of each unmanned aerial vehicle identified in the above-described step S1314, a combination of aerial vehicles may be determined so that the total loadable load of the unmanned aerial vehicles participating in the delivery becomes equal to or greater than the weight of the delivery target goods. For example, when the weight of the delivery target goods is 50 kg, unmanned aerial vehicles having a loadable weight of 22 kg, 15 kg, 15 kg, and 8 kg, respectively, may be selected to form an unmanned aerial vehicle group 2 capable of loading a total of 60 kg. As another example, if the weight of the delivery target goods is 100 kg, unmanned aerial vehicles having a loadable weight of 22 kg, 22 kg, 15 kg, 15 kg, 15 kg, 10 kg, and 5 kg, respectively, may be selected to form an unmanned aerial vehicle group 2 capable of loading a total of 104 kg.

The above operations described with reference to FIG. 9 may be performed in an order different from the order shown in FIG. 9.

Hereinafter, with reference to FIG. 10, an operation that may be performed when aerial vehicles capable of forming the unmanned aerial vehicle group 2 are not found among the currently available unmanned aerial vehicles in step S132 will be described in more detail. The steps shown in FIG. 10 may be understood to correspond to the operations performed in step S133 of FIG. 7.

Figure 10:
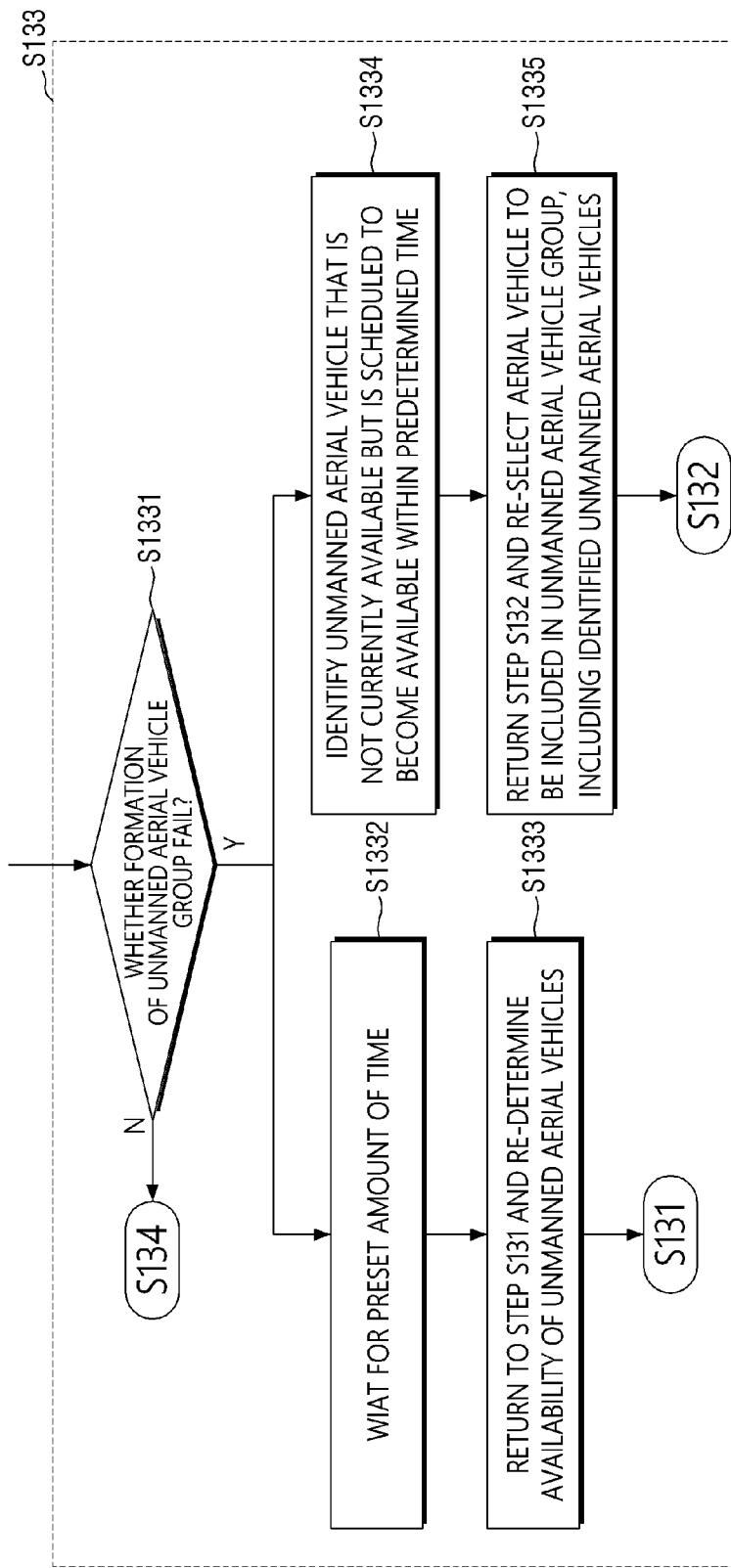
FIG. 10 is a diagram for describing in detail operations that may be performed when the formation of unmanned aerial vehicle group fails among various steps described with reference to FIG. 7.

Referring to FIG. 10, first, in step S1331, it may be determined whether the formation of the unmanned aerial vehicle group 2 fails because the aerial vehicles capable of forming the unmanned aerial vehicle group 2 are not found among the currently available unmanned aerial vehicles.

If it is determined that the formation of the unmanned aerial vehicle group 2 fails, steps S1332 and S1333 and/or steps S1334 and S1335 may be performed.

In steps S1332 and S1333, after waiting while withholding the formation of the unmanned aerial vehicle group 2 for a preset time, returning to the above-described step S131, it may be determined again whether each unmanned aerial vehicle included in the unmanned aerial vehicle pool is available.

In steps S1334 and S1335, unmanned aerial vehicles that are not currently available but are scheduled to become available within a predetermined time are identified, and the process returns to step S132 and may retry the formation of the unmanned aerial vehicle group 2 including the unmanned aerial vehicles identified as above. Here, an unmanned aerial vehicle that is not currently available but is scheduled to become available within a predetermined time may include, for example, an unmanned aerial vehicle that is currently charging although the current battery level is insufficient, an unmanned aerial vehicle that is currently participating in another delivery operation but the corresponding delivery operation is scheduled to be completed within a predetermined time, and an unmanned aerial vehicle that is expected to arrive near the delivery departure place within a predetermined time although the current distance from the delivery departure place exceeds the threshold.

Hereinafter, with reference to FIG. 11, an operation, in which the master aircraft 21 and the slave aircraft 22 are selected among the aircraft included in the unmanned aerial vehicle group 2, will be described in more detail. The steps shown in FIG. 11 may be understood to correspond to the operations performed in step S134 of FIG. 7.

As described above, the master aircraft 21 and the slave aircraft 22 may be classified according to whether or not they receive a control signal from the control server 1 while flying together for goods delivery. The master aircraft 21 may be configured to receive and process a control signal from the control server 1, and provide a control signal according to the processing result to the slave aircraft 22 to control the slave aircraft 22. The slave aircraft 22 may be configured to receive only the control signal of the master aircraft 21 without receiving the control signal from the control server 1. As the aerial vehicles included in the unmanned aerial vehicle group 2 are classified into the master aircraft 21 and the slave aircraft 22 and operated, the control server 1 does not need to control all the aircraft, so the control burden of the control server 1 can be greatly reduced.

In some embodiments, operations to be described with reference to FIG. 11 may be performed by the control server 1. In some other embodiments, these operations may be performed by each unmanned aerial vehicle included in the unmanned aerial vehicle group 2 or a part thereof.

First, in step S1341, hardware performance information of each aircraft included in the unmanned aerial vehicle group 2 may be identified. As the hardware performance information of each aircraft, information stored in the control server 1 may be used, or each aircraft may provide it.

In step S1342, the distance between the current position of each of the aircraft included in the unmanned aerial vehicle group 2 and the current position of the delivery target goods may be identified.

In step S1343, the time, at which each aircraft included in the unmanned aerial vehicle group 2 received the global navigation satellite system signal, may be identified.

In step S1344, an aircraft to serve as the master aircraft 21 may be selected based on at least some of the information identified in steps S1341 to S1343.

For example, among the aircraft included in the unmanned aerial vehicle group 2, the aircraft having the best hardware performance may be selected as the master aircraft 21. The master aircraft 21 needs to perform both communication and signal processing with the control server 1 and communication and signal processing with the slave aircraft 22-1 to 22-3. Since a considerable amount of throughput and processing power are required for this operation, the aircraft having the best hardware performance among the aircraft included in the unmanned aerial vehicle group 2 may be selected as the master aircraft 21.

If the hardware performance of the aircraft included in the unmanned aerial vehicle group 2 is similar, other criteria may be additionally considered. For example, the aircraft having the closest distance to the delivery target goods, the aircraft first starting up and receiving the global navigation satellite system signal first, etc. may be selected as the master aircraft 21.

Figure 11:
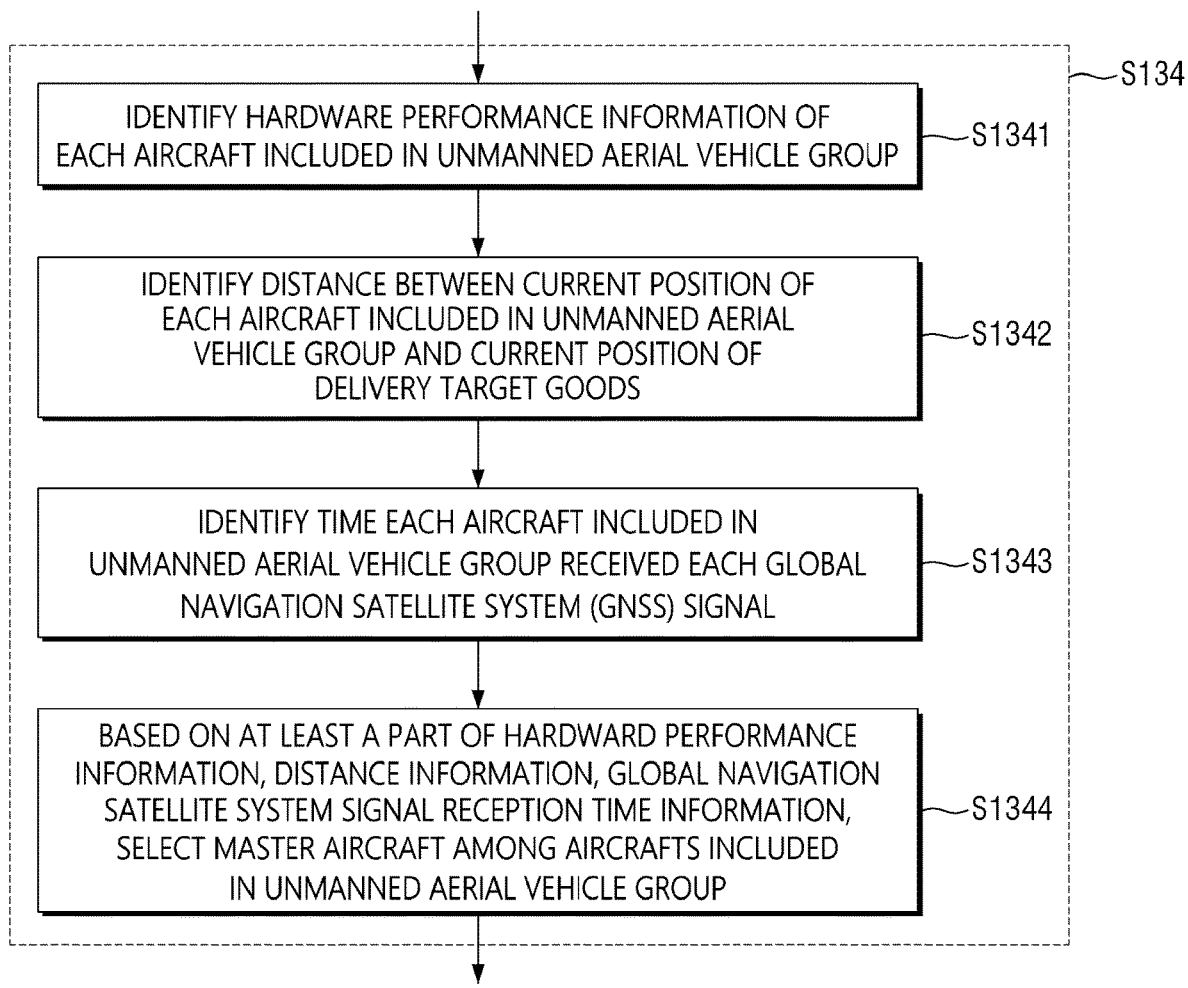
FIG. 11 is a view for describing in more detail the step of selecting a master aircraft and a slave aircraft from among the unmanned aerial vehicles included in the group among the various steps described with reference to FIG. 7.

On the other hand, it should be noted that the above-described operations are not necessarily performed in the order shown in FIG. 11, and steps S1341 to S1343 may be performed in a different order from that shown in FIG. 11 or may be performed substantially simultaneously.

So far, with reference to FIGS. 4 to 11, the method for forming the unmanned aerial vehicle group 2 according to an embodiment of the present disclosure has been described. According to this embodiment, for aircraft included in an unmanned aerial vehicle pool designated in advance as targets that can participate in a joint collaboration delivery, an unmanned aerial vehicle group 2 suitable for the joint collaboration delivery may be formed in consideration of attributes of the goods, such as the weight of the delivery target goods, and the movement distance required for delivery, etc. In addition, according to this embodiment, even if the formation of the unmanned aerial vehicle group 2 fails because the unmanned aerial vehicles are not currently found sufficient for the formation of the unmanned aerial vehicle group 2, it may retry the formation of the unmanned aerial vehicle group 2 after a predetermined action is taken. Also, according to the present embodiment, the master aircraft 21 and the slave aircraft 22 may be determined in consideration of hardware performance, current position, etc. of each unmanned aerial vehicle included in the unmanned aerial vehicle group 2.

Hereinafter, a flight starting procedure of the unmanned aerial vehicle group 2 according to some embodiments of the present disclosure will be described with reference to FIGS. 12 to 15.

Figure 12:
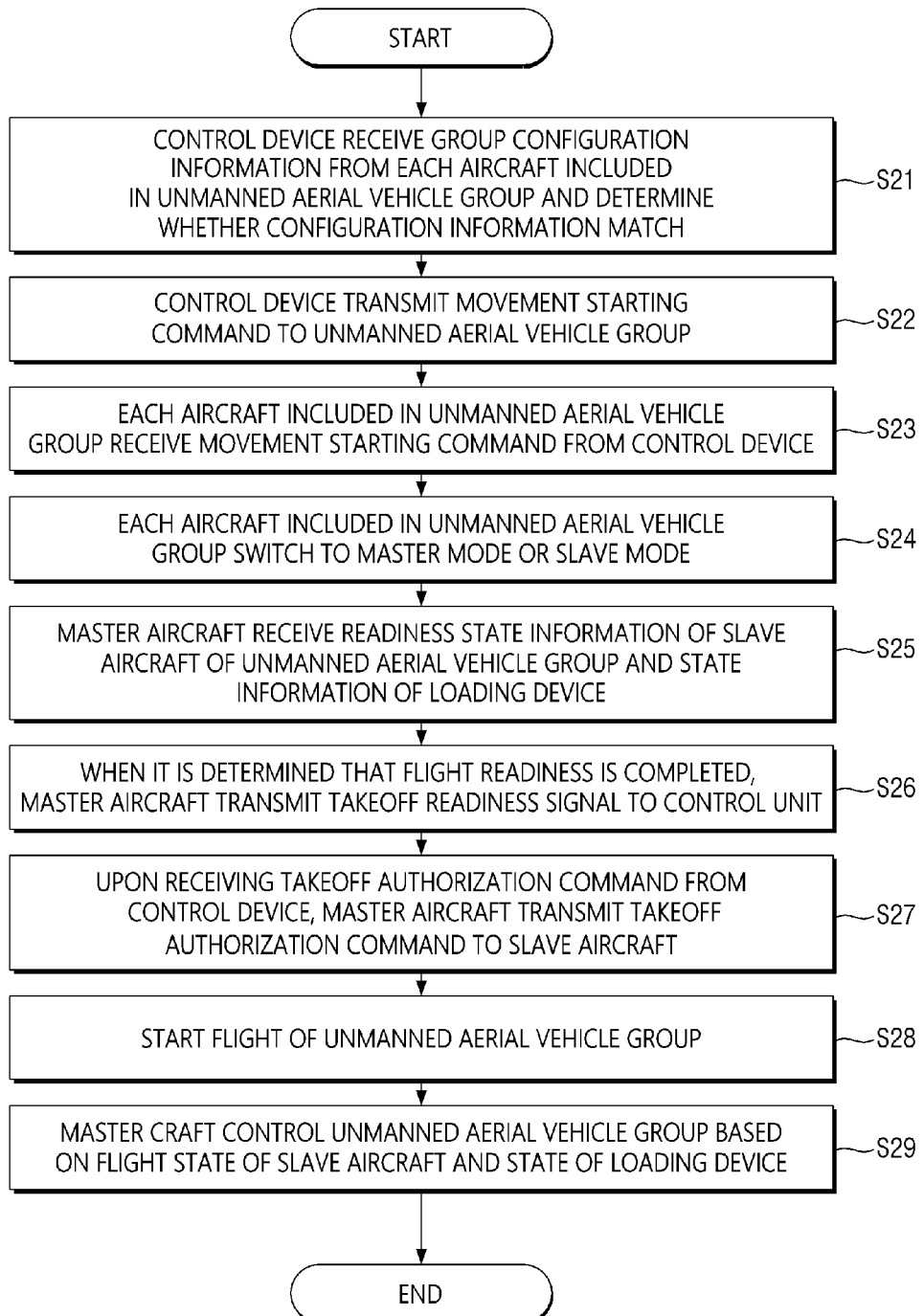
FIG. 12 is a flowchart of a method of delivering goods through a collaborating unmanned aerial vehicle group according to another embodiment of the present disclosure.

FIG. 12 is a flowchart of a method of delivering goods through a collaborating unmanned aerial vehicle group 2 according to an embodiment of the present disclosure. More specifically, the embodiment to be described below with reference to FIG. 12 may be used in the process of the unmanned aerial vehicle group 2 formed of a plurality of unmanned aerial vehicles being ready for flight start. In that respect, the present embodiment may be understood to correspond to step S2 of the embodiment described with reference to FIG. 3, but this is not necessarily the case. The method according to the present embodiment may include, for example, interaction of the control server 1, the master aircraft 21, the slave aircraft 22, and the loading device 30.

Referring to FIG. 12, first, in step S21, the control device, such as the control server 1, may receive information about the group configuration from each of the aircraft included in the unmanned aerial vehicle group 2, and determine whether it is matched. After performing the process of forming the unmanned aerial vehicle group 2 described above with reference to FIG. 4 and the like, the master aircraft 21 and each of the slave aircraft included in the unmanned aerial vehicle group 2 may hold configuration information of the unmanned aerial vehicle group 2. In step S21, the control server 1 may receive the group configuration information held by each aircraft, and determine whether there is no difference in the group configuration information held by each aircraft.

In some embodiments, the control server 1 may determine the loading state of the loading device 30 in step S21. Whether the delivery target goods are properly loaded in the loading device 30, and whether the loading device 30 is properly fastened to each aircraft of the unmanned aerial vehicle group 2 may be determined by the control server 1.

If there is no abnormality in the group configuration information and/or the loading state of the loading device 30 in step S21, the control device such as the control server 1 may transmit a movement starting command to the unmanned aerial vehicle group 2 in step S22.

In step S23, each aircraft of the unmanned aerial vehicle group 2 receives a movement starting command from the control server 1, and in step S24, the operation mode of each aircraft of the unmanned aerial vehicle group 2 may be switched. Specifically, the operation mode of the master aircraft 21 may be switched from the standalone mode to the master mode. Also, the slave aircraft 22 can be switched from the standalone mode to the slave mode. The slave aircraft 22, which has been switched to the slave mode, belongs to at least the unmanned aerial vehicle group 2 and may by controlled by the master aircraft 21 without being controlled by the control server 1 during the flight for delivering the goods.

In step S25, the master aircraft 21 may receive the readiness state information of the slave aircraft 22-1 to 22-3 and the state information of the loading device 30.

Specifically, the master aircraft 21 may receive flight readiness state information of each of the slave aircraft 22-1 to 22-3. The flight readiness state information may include information such as hardware performance, current position, battery level and expected flight available distance, thrust performance, maximum loadable load of each slave aircraft 22-1 to 22-3, and whether it is connected to the loading device.

Also, the master aircraft 21 may receive state information of the loading device 30. The state information may include information such as the current position of the loading device 30, the weight of the loaded goods, and whether it is connected to each of the aircraft included in the unmanned aerial vehicle group 2.

Based on the information received in step S25, the master aircraft 21 determines whether the flight readiness of the unmanned aerial vehicle group 2 is completed in step S26, and when it is determined that the flight readiness is completed, it transmits a signal indicating that takeoff readiness is completed to the control device such as the control server 1.

The control device such as the control server 1 receiving this determines when the unmanned aerial vehicle group 2 will start flying in consideration of the current route condition, etc., and if it is appropriate to start the flight, it transmits a takeoff authorization command to the master aircraft 21, or the master aircraft 21 and the slave aircraft 22.

When the master aircraft 21 receives the takeoff authorization command from the control server 1 in step S27, the master aircraft 21 transmits a takeoff authorization command to each of the slave aircraft 22-1 to 22-3.

In step S28, the unmanned aerial vehicle group 2 including the master aircraft 21 and the slave aircraft 22-1 to 22-3 may start flying.

After the flight from the delivery departure place to the destination is started, the master aircraft 21 may periodically perform in-flight control procedures based on the states of the slave aircraft 22 and the loading device 30 (S29). This will be described later.

Figure 13:
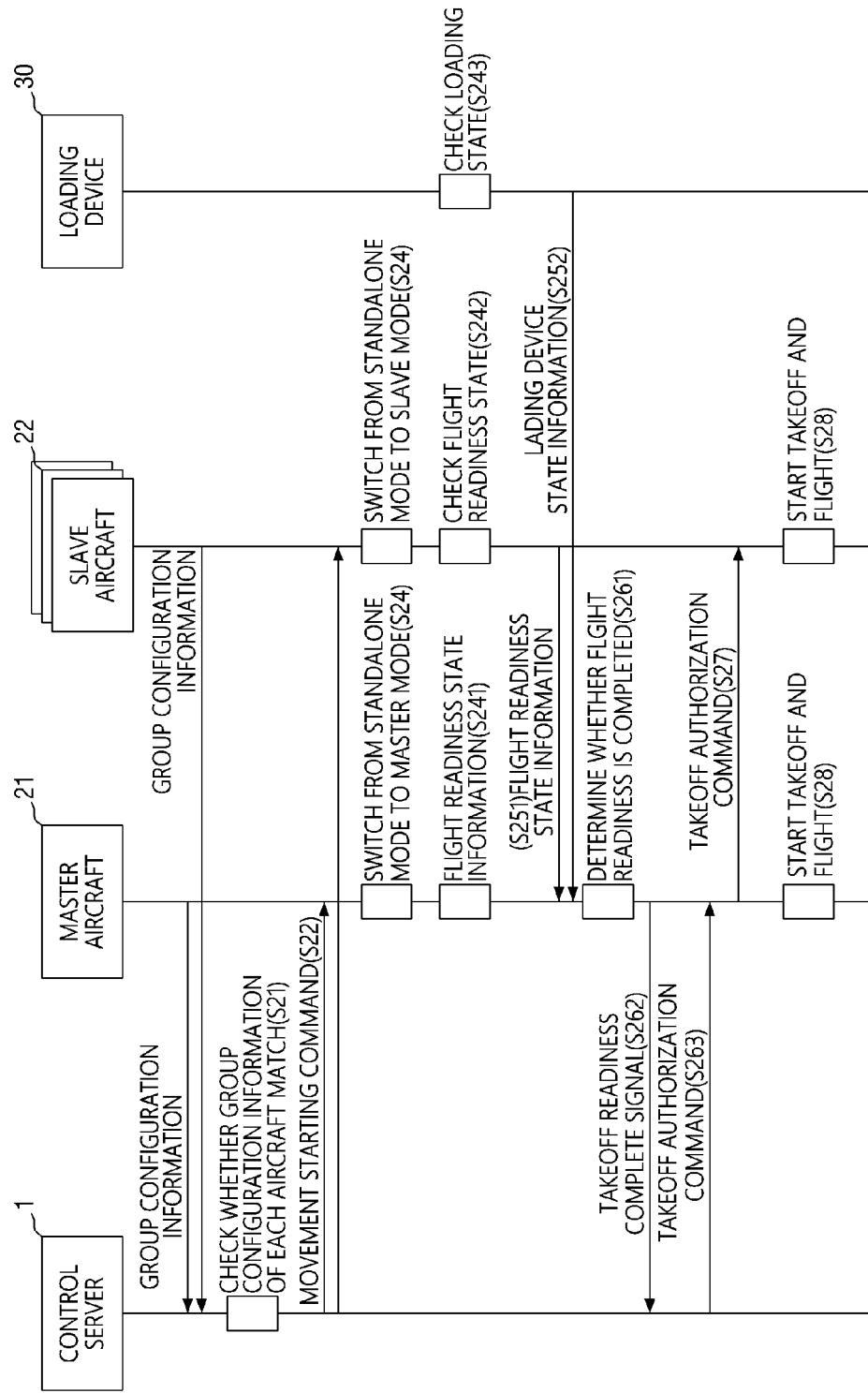
FIG. 13 is a sequence diagram for describing information and control signals exchanged between a control server, a master aircraft, a slave aircraft, and a loading device according to the embodiment described with reference to FIG. 12.

FIG. 13 is an auxiliary diagram for describing a message and/or signal sequentially exchanged between the control server 1, the master aircraft 21, slave aircraft 22 and loading device 30 during the flight starting readiness procedure of the unmanned aerial vehicle group 2 described with reference to FIG. 12.

Referring to FIG. 13, first, the unmanned aerial vehicle group configuration information held by the master aircraft 21 and the slave aircraft 22 is transmitted to the control server 1, and the control server 1 may determine whether the group configuration information of each aircraft matches with each other (S21).

The control server 1 may transmit a movement starting command to the master aircraft 21 and the slave aircraft 22 (S22). In some other embodiments, the control server 1 may transmit a movement starting command only to the master aircraft 21, and in this case, the master aircraft 21 may transfer the movement starting command to the slave aircraft 22.

The master aircraft 21 receiving the movement starting command may switch its operation mode from the standalone mode to the master mode (S24). In addition, the slave aircraft 22 receiving the movement starting command may switch its operation mode from the standalone mode to the slave mode (S24).

Subsequently, the master aircraft 21, the slave aircraft 22, and the loading device 30 may each perform a state check for flight (S241 to S243), and the slave aircraft 22 and the loading device 30 may transmit information about the state of themselves to the master aircraft 21 (S251 and S252).

The master aircraft 21 determines whether the flight readiness of the unmanned aerial vehicle group 2 is completed based on the state information of the master aircraft 21, the slave aircraft 22, and the loading device 30 (S261), and when it is determined that the flight readiness is completed, it transmits a signal indicating that the takeoff readiness is completed to the control server 1 (S262).

When it is appropriate to start the flight of the unmanned aerial vehicle group 2 in consideration of the condition of the route, the control server 1 may transmit a takeoff authorization command to the master aircraft 21 (S263). Upon receiving this, the master aircraft 21 may transfer a takeoff authorization command to the slave aircraft 22 (S27).

The master aircraft 21 and the slave aircraft 22 receiving the takeoff authorization command may take off in the air and start flying to the delivery destination (S28).

Figure 14:
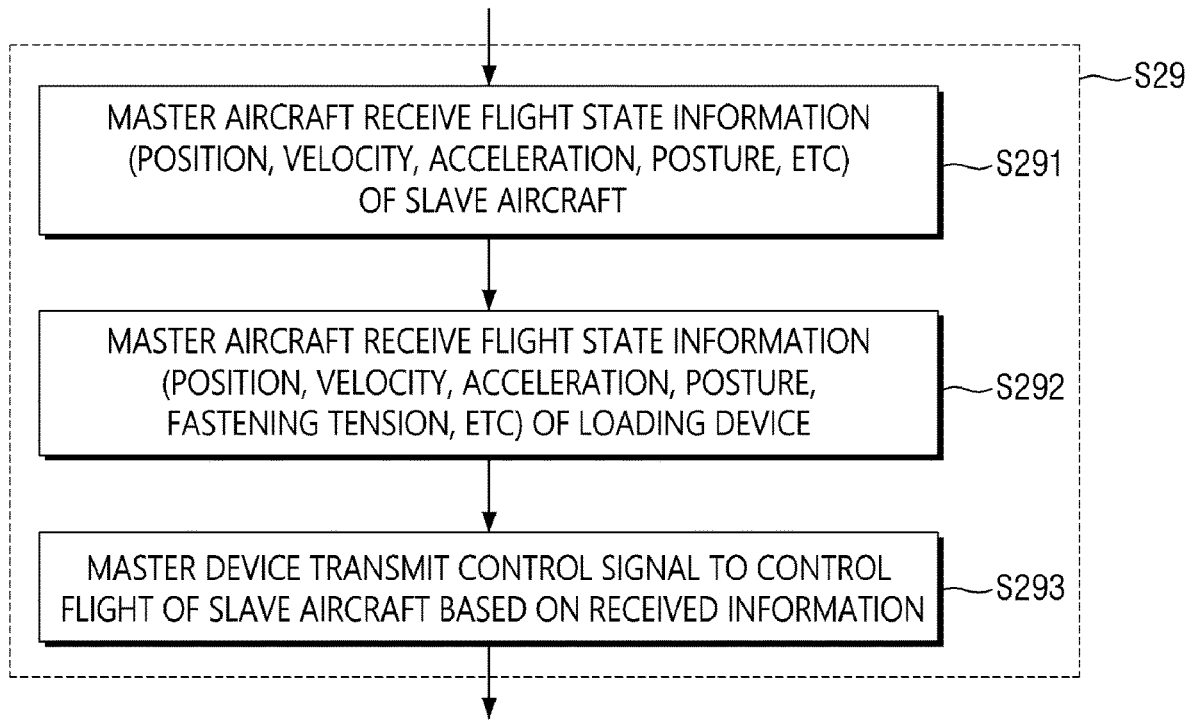
FIG. 14 is a diagram for describing in more detail a step, in which the master aircraft controls the flight of the unmanned aerial vehicle group among the various steps described with reference to FIG. 12.

FIG. 14 is a view for describing an exemplary method of controlling the flight of the unmanned aerial vehicle group 2 after the flight from the delivery departure place to the destination is started. The steps shown in FIG. 14 may be understood to be included in step S29 of FIG. 13.

The master aircraft 21 may check the state of the unmanned aerial vehicle group 2 at a necessary time or at regular time intervals during flight.

The master aircraft 21 may receive their state information from the slave aircraft 22 (S291). The state information of the slave aircraft 22 may include information about the current position, the battery level and the accordingly expected flight available distance, speed, acceleration, angular velocity, posture (roll, pitch, yaw), whether it is connected to the loading device 30, and the like. Furthermore, the state information may include information about the load currently being applied to each slave aircraft 22 due to the loading device 30.

The master aircraft 21 may receive the state information of the loading device 30 from the loading device 30 (S292). The state information of the loading device 30 may include information about a current position, speed, acceleration, posture (roll, pitch, yaw), and whether it is connected to each unmanned aerial vehicle. In addition, the state information may include information about the magnitude of a force (e.g., tension) applied to each connecting member connecting each unmanned aerial vehicle and the loading device 30.

The master aircraft 21 generates a control signal for controlling the flight state of the master aircraft 21 itself and the slave aircraft 22 based on the above-described information received from the slave aircraft 22 and the loading device 30. And, the master aircraft 21 may appropriately control the flight of the slave aircraft 22 by transmitting the control signal to the slave aircraft 22 (S293).

Figure 15:
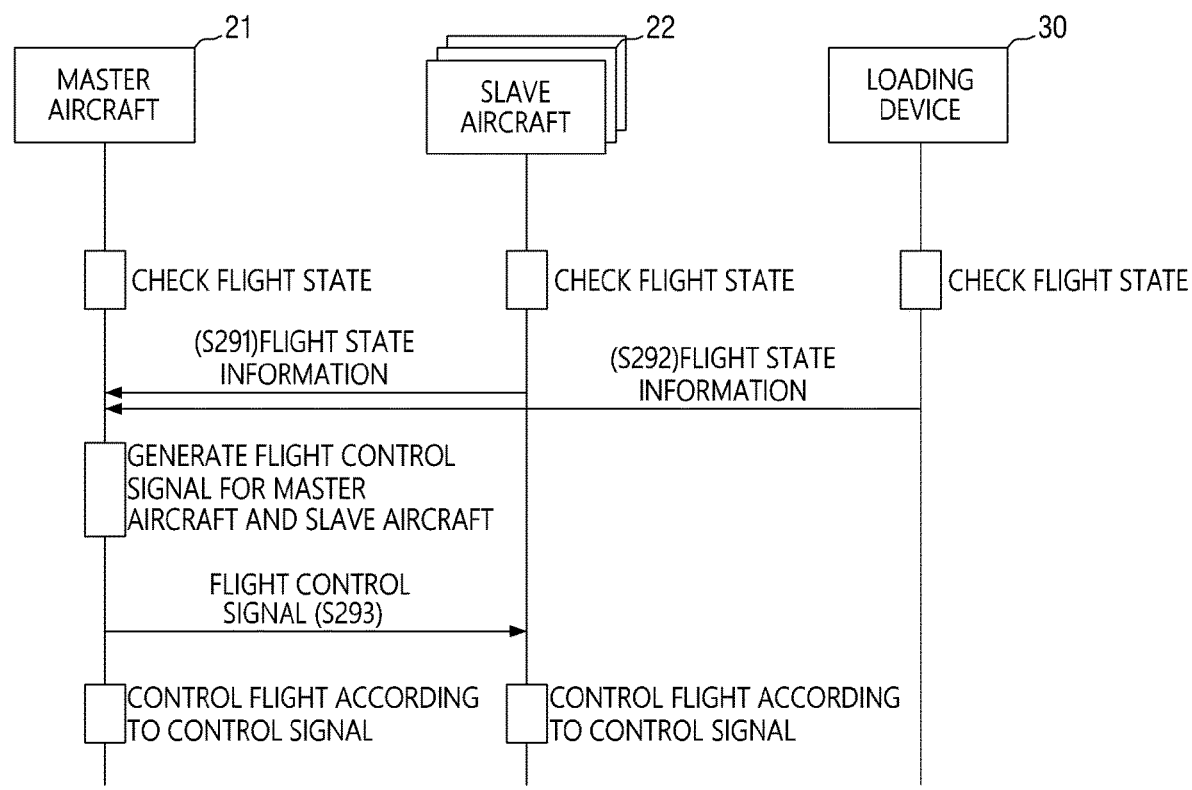
FIG. 15 is a sequence diagram for describing information and control signals exchanged between the master aircraft, the slave aircraft, and the loading device according to the embodiment described with reference to FIG. 14.

FIG. 15 is an auxiliary drawing for describing a message and/or signal sequentially exchanged between the master aircraft 21, the slave aircraft 22, and the loading device 30 for flight control of the unmanned aerial vehicle group 2 described with reference to FIG. 14.

First, the master aircraft 21, the slave aircraft 22, and the loading device 30 may check or confirm the respective flight state, and the slave aircraft 22 and the loading device 30 may transfer the state information to the master aircraft 21 (S291 and S292).

The master aircraft may generate a flight control signal for appropriately controlling the flight of the master aircraft and each slave aircraft based on the above-described state information, and transmit the flight control signal to each slave aircraft (S293). The flight control signal for appropriately controlling the flight of each aircraft may include a control signal for adjusting the position, speed, acceleration, angular velocity, altitude and posture of the aircraft, output of the thrust generating unit or the number of revolutions per minute.

The master aircraft 21 and the slave aircraft 22 may fly according to the flight control signal generated by the master aircraft 21.

So far, with reference to FIGS. 12 to 15, the flight starting procedure of the unmanned aerial vehicle group 2 and the control procedure after starting the flight according to an embodiment of the present disclosure have been described. According to this embodiment, each of the aircraft included in the unmanned aerial vehicle group 2 that collaborates and jointly transports the delivery target goods loaded in the loading device can start flying to the destination in an efficient and safe manner. In addition, according to this embodiment, the slave aircraft 22 included in the unmanned aerial vehicle group 2 are switched from the standalone mode controlled by the control server 1 to the slave mode controlled by the master aircraft 21. As a result, communication traffic for the control server 1 to coordinate and control a number of unmanned aerial vehicles can be reduced, and the demand for hardware expansion or manpower required for control can be reduced.

Hereinafter, with reference to FIGS. 16 to 23, according to some embodiments of the present disclosure, a method of adjusting the positions of the loading device 30 transported by the unmanned aerial vehicle group 2 and each aircraft included in the unmanned aerial vehicle group 2 will be described in more detail.

Figure 16:
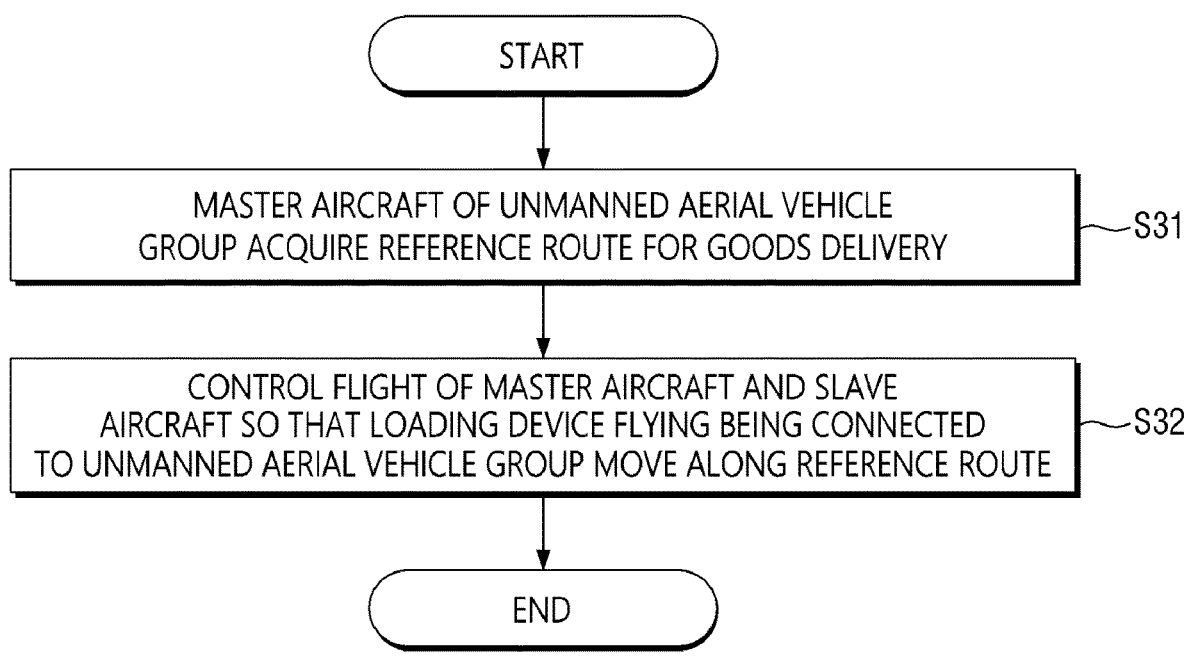
FIG. 16 is a flowchart of a method of delivering goods through a collaborating unmanned aerial vehicle group according to another embodiment of the present disclosure.

FIG. 16 is a flowchart of a method of delivering goods through a collaborating unmanned aerial vehicle group 2 according to an embodiment of the present disclosure. More specifically, the embodiment to be described below with reference to FIG. 16 may be used in the process of adjusting the absolute position and relative position of each aircraft while the unmanned aerial vehicle group 2 formed of a plurality of unmanned aerial vehicles jointly flies for the transport of goods. From that point of view, the present embodiment may be understood to correspond to step S3 of the embodiment described with reference to FIG. 3, but this is not necessarily the case. The method according to this embodiment may include, for example, the interaction of the master aircraft 21, the slave aircraft 22, and the loading device 30.

Referring to FIG. 16, first, in step S31, the master aircraft 21 of the unmanned aerial vehicle group 2 may acquire a reference route 201 for delivery of goods.

In an embodiment, the reference route 201 may be acquired by receiving from the control server 1 or the control device. The control server 1 may consider the flight plans of other aircraft currently in flight or scheduled to be flown, the accordingly condition of the route, the terrain features or obstacles between the delivery departure place 202 and the delivery destination 203 to determine an appropriate reference route 201 connecting the departure place 202 and the destination 203.

In another embodiment, the reference route 201 may be directly determined by the master aircraft 21, and information required for determining this may be acquired from the control server 1 or other third party device.

In step S32, the master aircraft 21 may control the flight of itself and the slave aircraft 22 so that the unmanned aerial vehicle group 2 moves along the reference route 201.

In one embodiment, the flying of the unmanned aerial vehicle group 2 along the reference route 201 may be that the loading device 30 transported by the unmanned aerial vehicle group 2 moves along the reference route 20. In another embodiment, the flying of the unmanned aerial vehicle group 2 along the reference route 201 may be that the master aircraft 21 of the unmanned aerial vehicle group 2 moves along the reference route 201.

Hereinafter, the process (S32) of the master aircraft 21 controlling the flight so that the loading device 30 moves along the reference route 201 will be described in more detail with reference to FIGS. 17 and 18.

Figure 17:
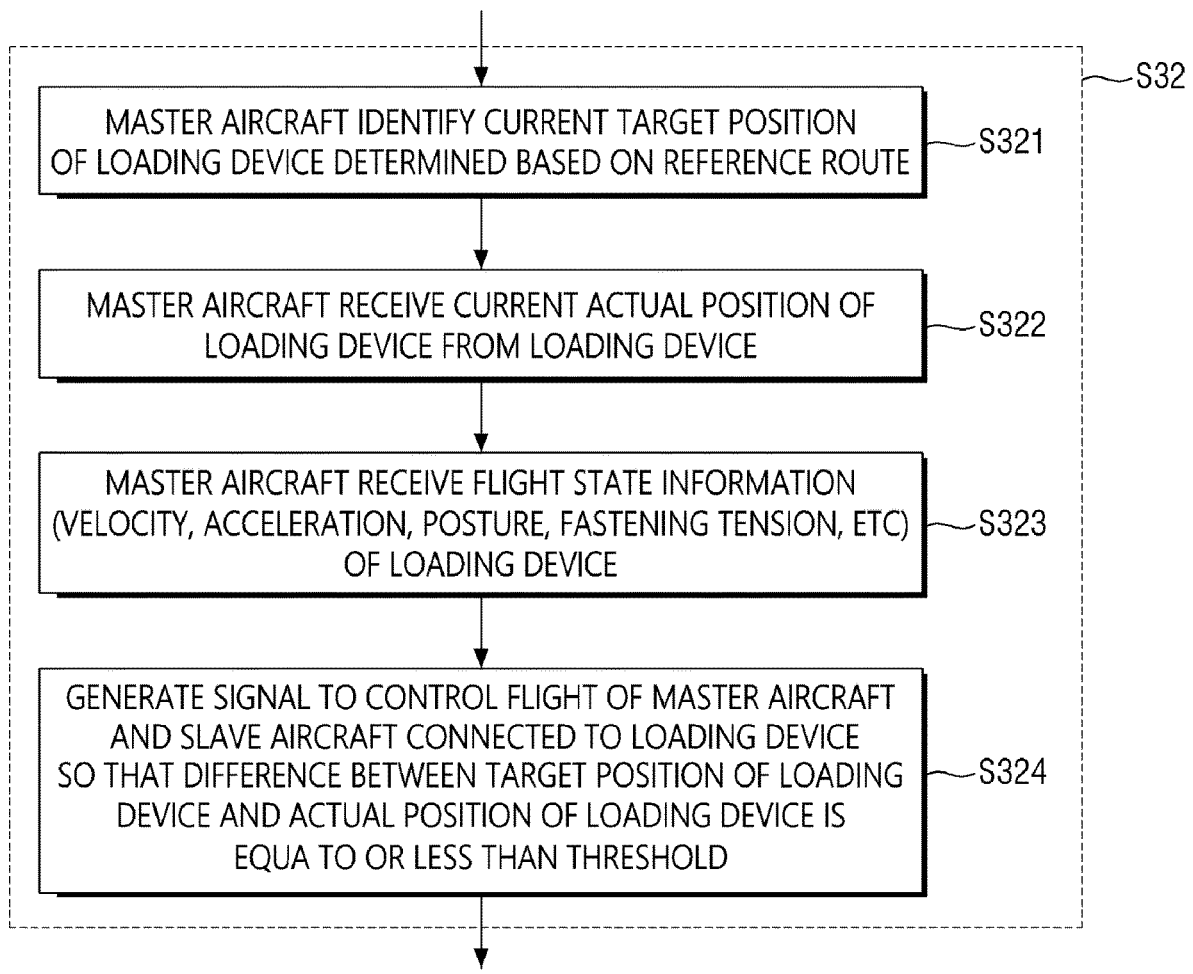
FIGS. 17 and 18 are reference views for describing a step of controlling the loading device, in which the delivery target goods are loaded, to move along the planned reference route in the embodiment described with reference to FIG. 16.
Figure 18:
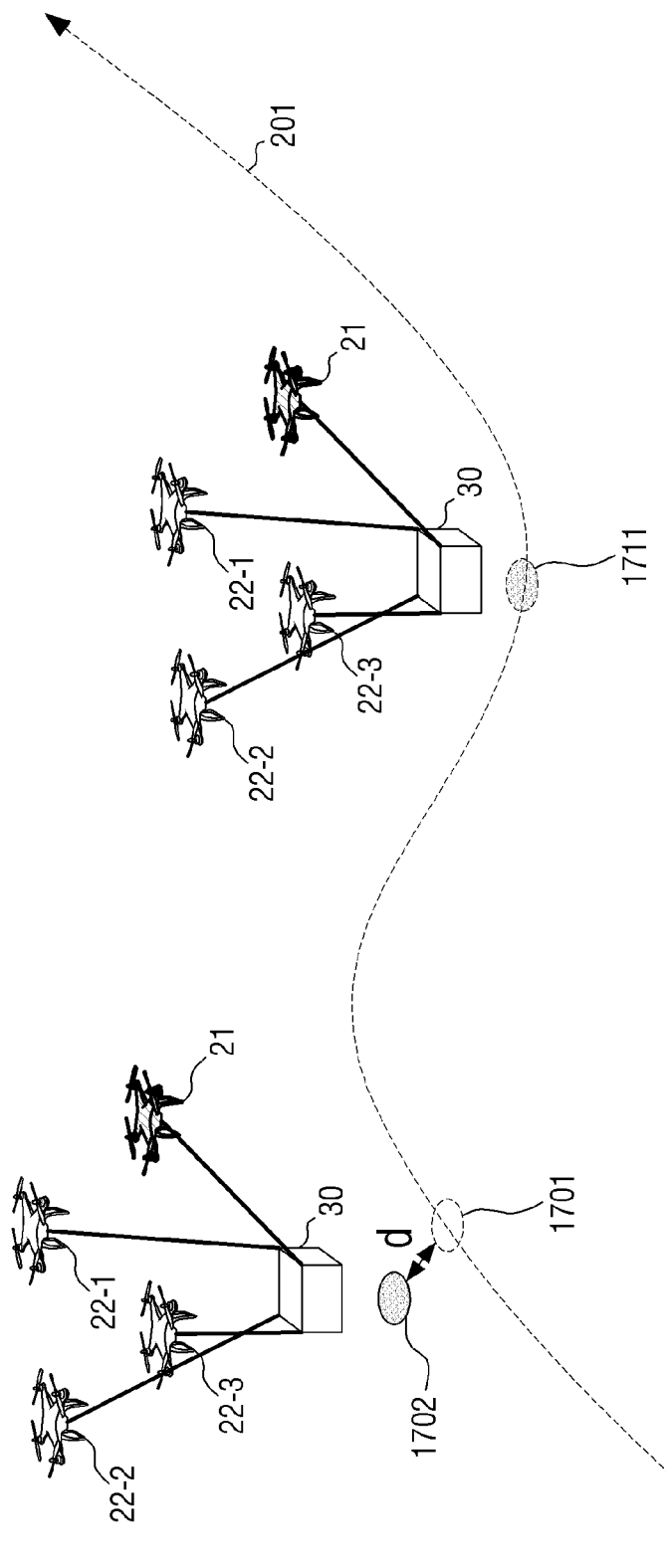

Referring to FIG. 17, in step S321, the master aircraft identifies the current target position of the loading device determined based on the reference route 201. In the unmanned aerial vehicle group shown in the left side of FIG. 18, the target position where the loading device 30 should be present may be understood as a point 1701. In the unmanned aerial vehicle group shown in the right side of FIG. 18, the target position where the loading device 30 should be present may be understood as a point 1711.

In step S322, the master aircraft receives the current actual position of the loading device from the loading device 30. As described above, the loading device 30 may include a satellite signal receiving unit for identifying its position, and a sensor for measuring its acceleration, angular velocity, posture, and the like. In the unmanned aerial vehicle group shown in the left side of FIG. 18, the actual position of the current loading device 30 may be understood as a point 1702. In the unmanned aerial vehicle group shown in the right side of FIG. 18, the actual position of the current loading device 30 may be understood as a point 1711.

In step S323, the master aircraft 21 may receive flight state or movement state information of the loading device 30 from the loading device 30. Here, the state information includes the posture such as the current speed, acceleration, angular velocity, inclination of the loading device 30, the weight of the loaded goods, whether fastening with each unmanned aerial vehicle is maintained, and the magnitude of the force each applied to the connecting member for each unmanned aerial vehicle. The state information may be acquired by a sensor provided in the loading device 30 and provided to the master aircraft 21 through the communication unit of the loading device 30.

In step S324, the master aircraft 21 may calculate a difference, or an error (e.g., d in FIG. 18) between the current target position and the current actual position of the loading device 30. When the difference (d) exceeds a preset threshold, the master aircraft 21 may generate a signal for controlling the unmanned aerial vehicle 2 so that the loading device 30 is located at the target position. Specifically, by adjusting the positions of the master aircraft 21 and the slave aircraft 22 that are respectively connected to the loading device 30 through each connecting member to tow the loading device 30 in the air, as a result, the position of the loading device 30 can be made close to the target position. The unmanned aerial vehicle group shown in the right side of FIG. 18 is an example, in which the loading device 30 is correctly located at the target position on the reference route 201. Position adjustment of the master aircraft 21 and the slave aircraft 22 will be described later in more detail with reference to FIGS. 19 to 23.

Before describing a method of adjusting the positions of the master aircraft 21 and the slave aircraft 22, FIGS. 20 to 23 will be referred first.

Figure 20:
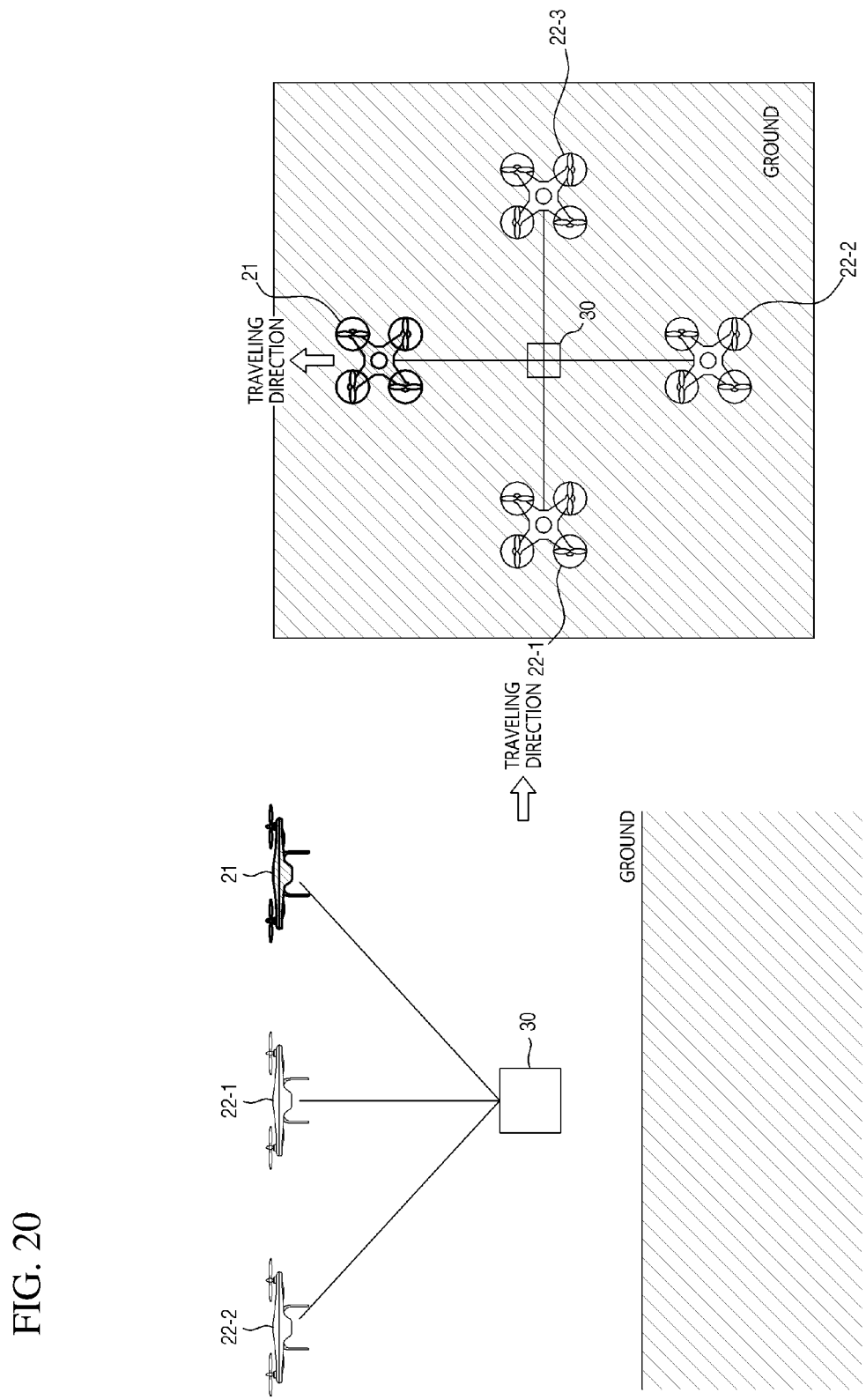
FIG. 20 is a diagram illustrating an exemplary horizontal and vertical arrangement of an unmanned aerial vehicle group that collaborates to deliver goods and a loading device in accordance with some embodiments of the present disclosure.

FIG. 20 is a diagram illustrating an exemplary horizontal and vertical arrangement of an unmanned aerial vehicle group that collaborates to deliver goods and loading device in accordance with some embodiments of the present disclosure. The master aircraft 21 and the slave aircraft 22-1 and 22-2 included in the unmanned aerial vehicle group 2 may fly while being connected to the loading device 30 through the connecting member. In other words, the unmanned aerial vehicle group 2 may fly toward the destination while collaborating with each other to lift the loading device 30 in the air.

The left drawing of FIG. 20 shows an exemplary view from the side of the arrangement of the aircraft 21, 22-1 to 22-3 of the unmanned aerial vehicle group 2 in flight and the loading device 30. As shown in the left drawing of FIG. 20, the aircraft 21, 22-1 to 22-3 of the unmanned aerial vehicle group 2 may be controlled to fly while maintaining the same altitude.

The right drawing of FIG. 20 shows an exemplary view from above of the arrangement of the aircraft 21, 22-1 to 22-3 of the unmanned aerial vehicle group 2 in flight and the loading device 30.

Figure 21:
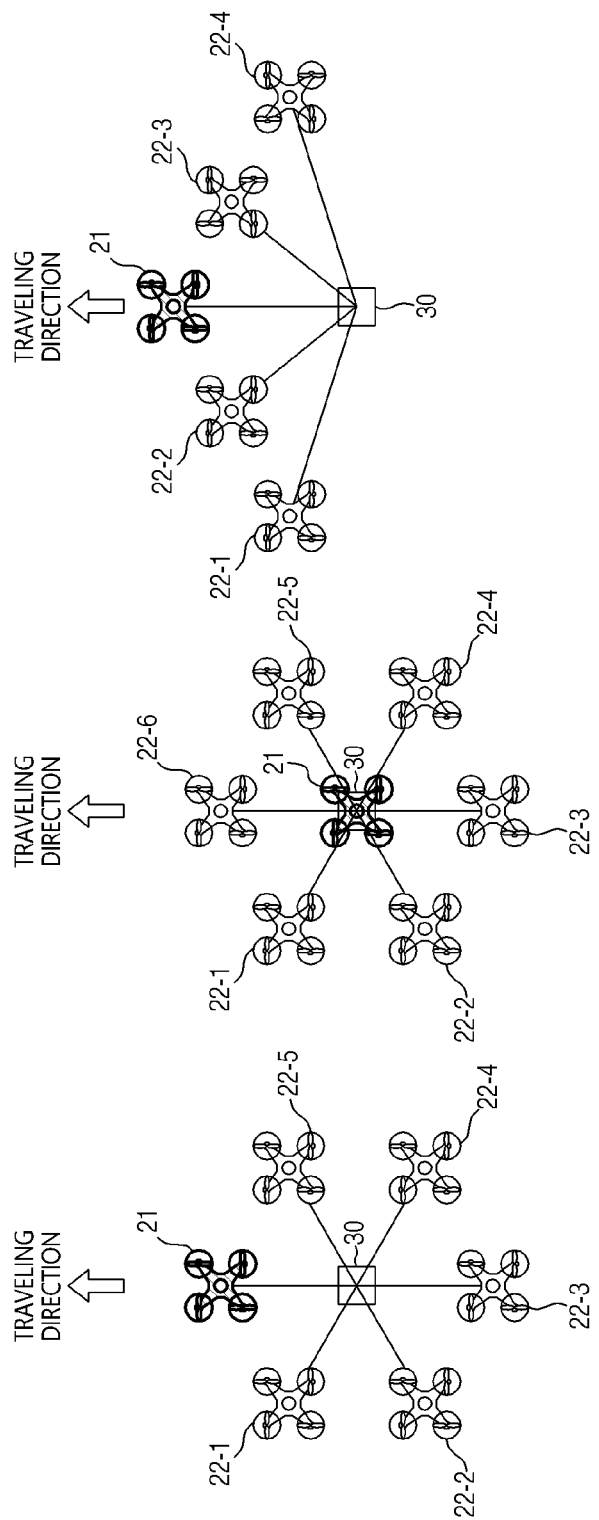
FIG. 21 is a view illustrating various horizontal arrangements of an unmanned aerial vehicle group that collaborate to deliver goods and a loading device according to some embodiments of the present disclosure.

FIG. 21 is a view illustrating other examples of horizontal arrangement of an unmanned aerial vehicle group that collaborates to deliver goods and a loading device according to some embodiments of the present disclosure. As shown in the left drawing of FIG. 21, in some embodiments, the master aircraft 21 and the slave aircraft 22-1 to 22-5 included in the unmanned aerial vehicle group 2 may be controlled to fly while forming a regular polygonal formation with the loading device 30 as the center. In some embodiments, it can be controlled to fly in formation so that the horizontal distance between each of the aircraft 21 and 22-1 to 22-5 included in the unmanned aerial vehicle group 2 and the loading device 30 is equal to each other. In other words, when the unmanned aerial vehicle group 2 is viewed from above, it may be controlled to fly so that the distance between each aircraft and the loading device 30 is the same.

In some other embodiments, as shown in the central drawing and the right drawing of FIG. 21, it can be controlled so that the master aircraft 21 and the slave aircraft 22-1 to 22-5 included in the unmanned aerial vehicle group 2 have various shapes of formation. For example, as shown in the central drawing of FIG. 21, the master aircraft 21 may be located directly above the loading device 30, and the slave aircraft 22-1 to 22-6 may make a flight formation forming a regular polygonal shape with the master aircraft 21 and the loading device 30 as the center. As another example, as shown in the right drawing of FIG. 21, a flight formation, in which the master aircraft 21 and the slave aircraft 22-1 to 22-4 form a boomerang shape or a V shape, may be used.

In some embodiments of the present disclosure, the positions of the master aircraft 21 and the slave aircraft 22 may be specified as relative positions with respect to the reference position of the unmanned aerial vehicle group 2. In one embodiment, the reference position of the unmanned aerial vehicle group 2 may be the position of the loading device 30 transported by the unmanned aerial vehicle group 2. In this case, the positions of the master aircraft 21 and the slave aircraft 22 may be specified as relative positions with respect to the position of the loading device 30. Specifically, the positions of the master aircraft 21 and the slave aircraft 22 are not absolute positions expressed in latitude and longitude according to the global navigation satellite system, but can be specified by designating the azimuth, vertical distance and horizontal distance from the loading device 30.

Figure 22:
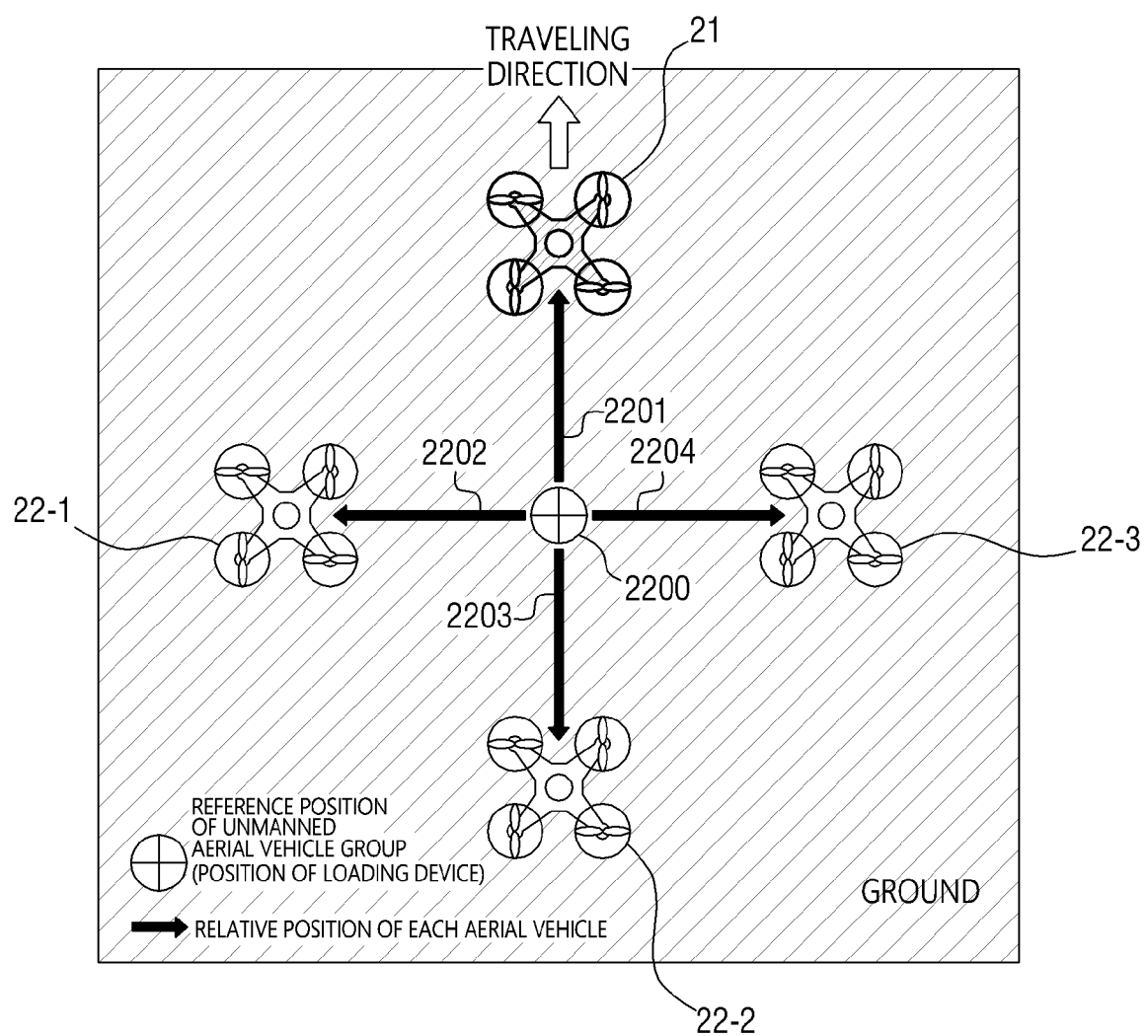
FIG. 22 is a reference diagram for describing a method of designating positions of each aircraft included in an unmanned aerial vehicle group that collaborates to deliver goods according to some embodiments of the present disclosure.

Referring to FIG. 22, the positions of the master aircraft 21 and the slave aircraft 22-1 to 22-3 may be specified as relative positions 2201, 2202, 2203, 2204 with respect to the reference position 2220, that is, the position of the loading device 30. For example, the current target position of the master aircraft 21 may be designated as 5 m in the north direction of the loading device 30, the current target position of the slave aircraft 22-1 may be designated as 5 m in the west direction of the loading device 30, the current target position of the slave aircraft 22-2 may be designated as 5 m in the south direction of the loading device 30, and the current target position of the slave aircraft 22-3 may be designated as 5 m in the east direction of the loading device 30.

It should be noted that the relative positions 2201, 2202, 2203, 2204 of the master aircraft 21 and the slave aircraft 22-1 to 22-3 do not need to be changed during flight unless there is a special circumstance that requires changing the horizontal arrangement or formation shape of the aircraft included in the unmanned aerial vehicle group 2.

Figure 19:
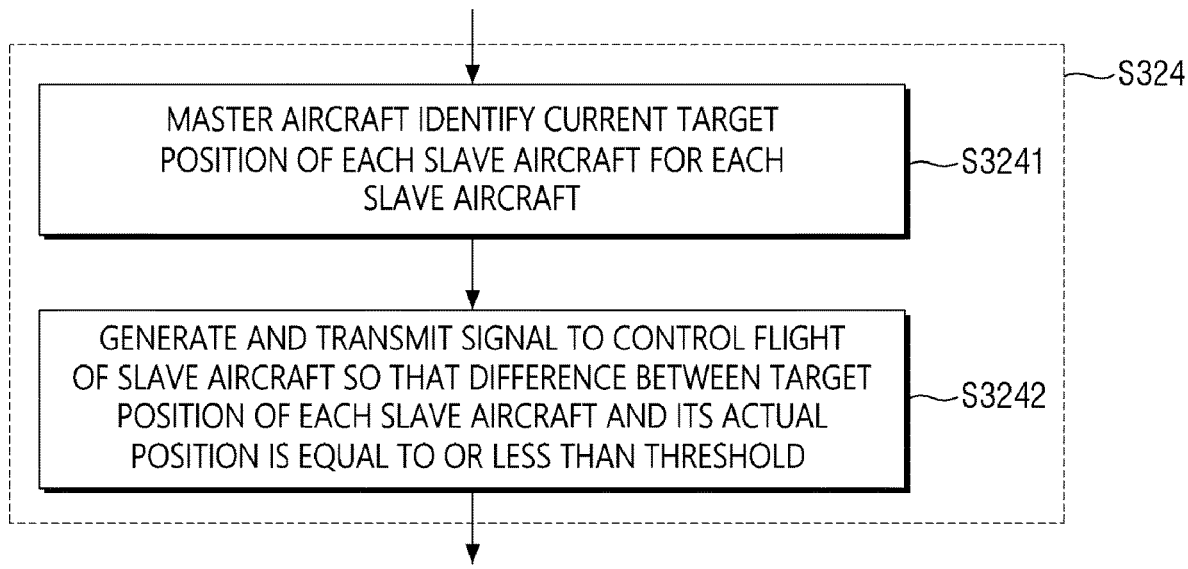
FIG. 19 is a diagram for describing in more detail some of the various steps described with reference to FIG. 17.

Referring now to FIG. 19, an operation (S324) of controlling the master aircraft 21 and the slave aircraft 22 in order to maintain the loading device 30 in the correct position will be described in detail.

Referring to FIG. 19, first, in step S3241, the master aircraft 21 may identify the current target position of each of the slave aircraft 22. The current target position may be identified as a relative position of each aircraft with respect to the current target position of the loading device 30.

Subsequently, in step S3242, a signal for controlling the flight of the aircraft so that the difference between the current target position and the current actual position of the master aircraft 21 and each slave aircraft 22 is less than or equal to a preset threshold may be generated by the master aircraft 21 and transmitted to each slave aircraft 22.

Figure 23:
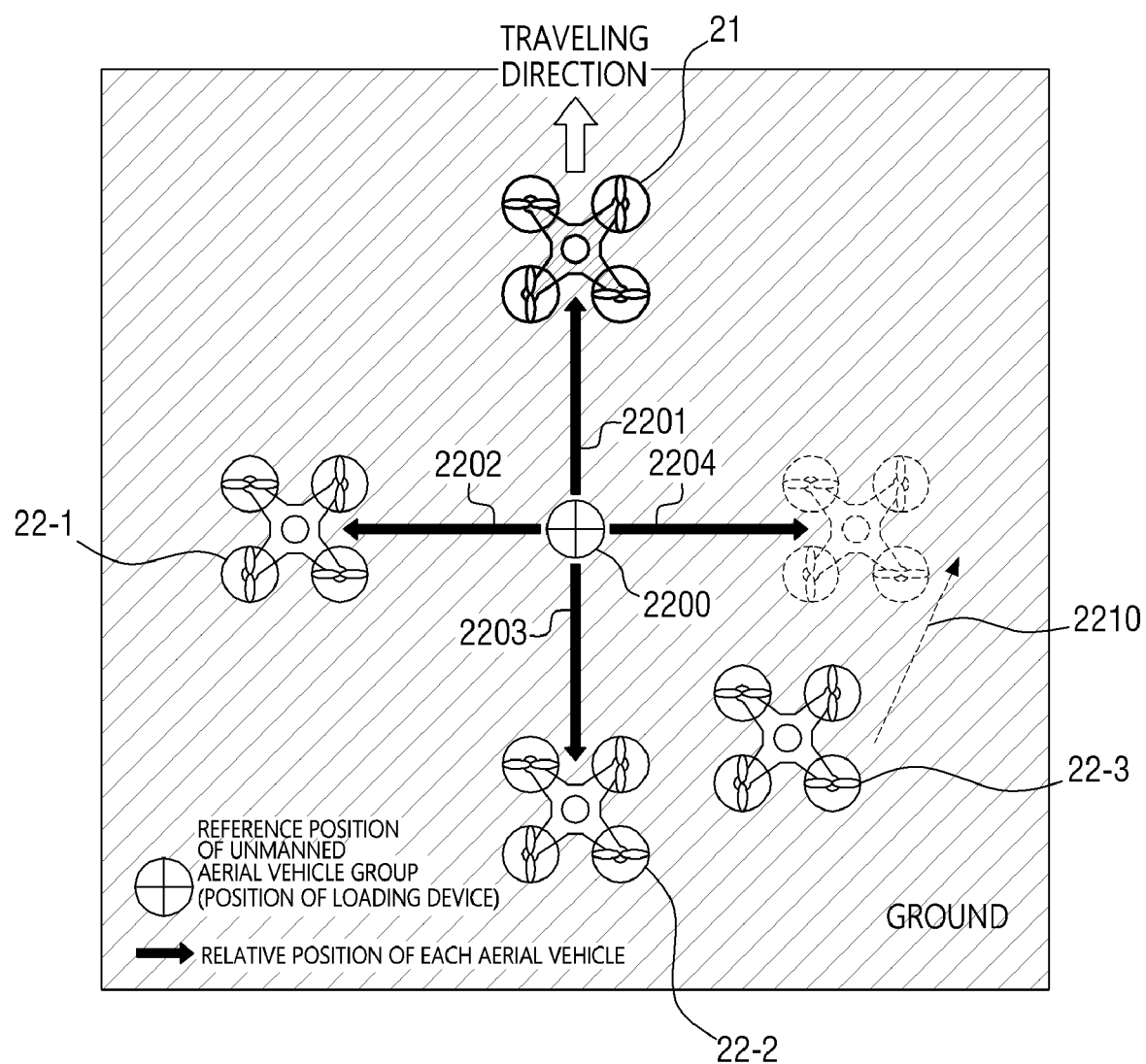
FIG. 23 is a reference diagram for describing a method of adjusting the position of each aircraft included in an unmanned aerial vehicle group that collaborate to deliver goods according to some embodiments of the present disclosure.

As an example shown in FIG. 23, when the slave aircraft 22-3 deviates from the current target position by more than a threshold, the master aircraft 21 generates a control signal for moving the slave aircraft 22-3 in an appropriate direction and distance 2210 and transmit it to the slave aircraft 22-3 so that the positions of the slave aircraft 22-3 can be controlled.

Through the above control, the master aircraft 21 can adjust the position of each aircraft included in the unmanned aerial vehicle group 2, and as a result, the loading device 30 transported by the unmanned aerial vehicle group 2 can be transported along a planned reference route.

So far, with reference to FIGS. 16 to 23, the method of adjusting the positions of the loading device 30 transported by the unmanned aerial vehicle group 2 and each aircraft included in the unmanned aerial vehicle group 2 according to some embodiments of the present disclosure has been described.

According to this embodiment, after the unmanned aerial vehicle group 2 that collaborates to jointly transports the delivery target goods loaded in the loading device starts flying, the flight of the entire unmanned aerial vehicle group 2 can be controlled through the master aircraft 21. In other words, there is no need for the control server 1 or the control device to control each aircraft included in the unmanned aerial vehicle group 2, and communication traffic and processing load of the control server 1 can be reduced.

Also, according to this embodiment, the loading device 30 transported by the unmanned aerial vehicle group 2 may be controlled to be transported along a planned movement route. Since the flight of the unmanned aerial vehicle group 2 aims to safely transport the goods loaded in the loading device 30 from the departure place to the destination, it may be preferable to minimize the potential for damaging the loaded goods due to the collision with obstacles, terrain features, other aerial vehicles, or birds on the movement route. Even if the movement reference route 201 of the unmanned aerial vehicle group 2 is calculated in advance so that the risk of collision with the obstacle is minimized, if the unmanned aerial vehicle 21 or 22 is controlled to move along the reference route 201, by the difference between the position of the loading device 30 towed in the air by the unmanned aerial vehicle 21 or 22 and the position of the unmanned aerial vehicle 21, 22, the possibility that the loaded goods collide with an obstacle or the like cannot be completely excluded. In this embodiment, the entire unmanned aerial vehicle group 2 can be controlled so that the position of the loading device 30 loaded with goods is located on the pre-planned reference route 201 during the flight of the unmanned aerial vehicle group 2. So, the loaded goods are controlled to move on the pre-planned reference route 201, and the possibility that the loaded goods collide with an obstacle or the like can be minimized.

Also, according to the present embodiment, the position of each aircraft included in the unmanned aerial vehicle group 2 may be designated as a relative position (e.g., orientation and distance from the loading device) with respect to the reference position of the unmanned aerial vehicle group 2 (e.g., the position of the loading device 30). In addition, the relative positions of the aircraft included in the unmanned aerial vehicle group 2 do not need to be changed during the flight from the departure place to the destination unless a special circumstance arises to change the formation shape of the unmanned aerial vehicle group 2. Therefore, in the flight control method of the unmanned aerial vehicle group 2 according to the present embodiment, it is not necessary to calculate and process individual positions of each individual aircraft 21, 22-1 to 22-6 of the unmanned aerial vehicle group 2 at each time point during flight to the destination. Due to this, the processing load generated on the control server 1 or the master aircraft 21 is reduced, and it is possible to control the flight of the unmanned aerial vehicle group 2 only with a relatively low specification processor.

Hereinafter, with reference to FIGS. 24 to 27, according to some embodiments of the present disclosure, a method of properly maintaining a load applied to each aircraft during collaborative delivery by an unmanned aerial vehicle group 2 will be described in more detail.

Figure 24:
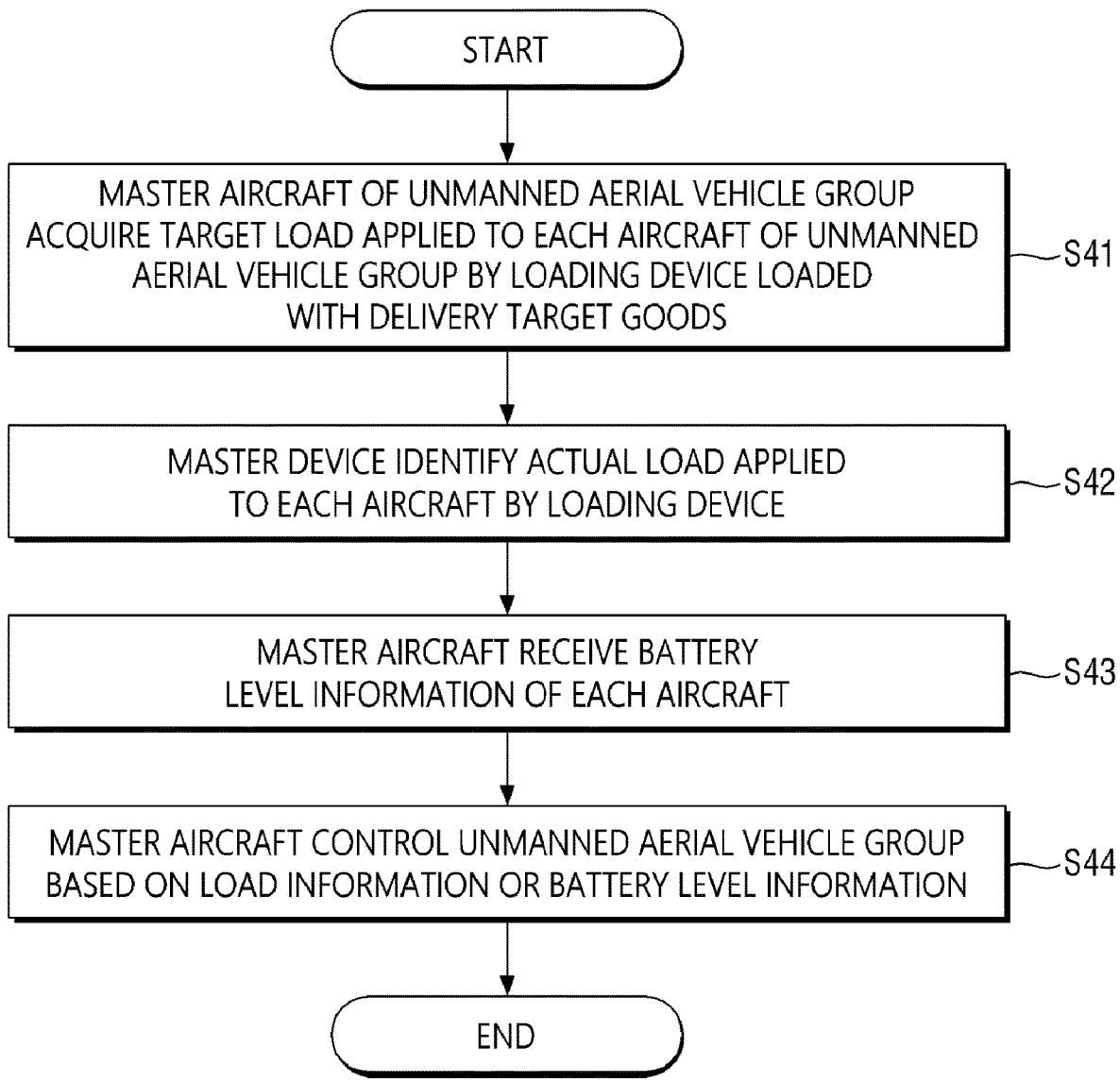
FIG. 24 is a flowchart of a method of delivering goods through a collaborating unmanned aerial vehicle group according to another embodiment of the present disclosure.

FIG. 24 is a flowchart of a method of delivering goods through a collaborating unmanned aerial vehicle group 2 according to an embodiment of the present disclosure. A situation, in which the load actually applied to each aircraft included in the unmanned aerial vehicle group 2 is different from the planned load or the target load, may occur due to various external factors, such as changing the flight direction while the unmanned aerial vehicle group 2 is flying along the movement route 201, or a change in airflow during flight. The embodiment to be described below with reference to FIG. 24 may be used by an unmanned aerial vehicle group 2 formed of a plurality of unmanned aerial vehicles to properly maintain or adjust the load applied to each of the aircraft during joint flight for transport of goods.

This embodiment may be understood to correspond to step S3 of the embodiment described with reference to FIG. 3, but this is not necessarily the case. The method according to this embodiment may include, for example, the interaction of the master aircraft 21, the slave aircraft 22, and the loading device 30.

Referring to FIG. 24, first, in step S41, the master aircraft 21 of the unmanned aerial vehicle group 2 may acquire the target load to be applied to each of the aircraft 21, 22 of the unmanned aerial vehicle group 2 by the loading device 30 loaded with the delivery target goods.

In one embodiment, the target load may be acquired by receiving from the control server 1 or the control device.

The control server 1 may identify the loadable load of each unmanned aerial vehicle by receiving information about the loadable load from each unmanned aerial vehicle at the time when the unmanned aerial vehicle group 2 is formed before flight starts. The control server 1 may combine the unmanned aerial vehicles so that the total loadable load of each unmanned aerial vehicle is equal to or greater than the weight of the delivery target goods, based on the loadable load information of each unmanned aerial vehicle, and also determine the target load to be applied to each unmanned aerial vehicle. The target load may be determined by the control server 1 so that a proper load is distributed to each unmanned aerial vehicle in consideration of the weight of the deliver target goods, hardware specifications such as the thrust performance of the thrust generating unit of each unmanned aerial vehicle, the battery level of each unmanned aerial vehicle, and the flight available distance.

Meanwhile, in another embodiment, the target load may be determined by the master aircraft 21 rather than the control server 1.

First, in step S42, the master aircraft 21 of the unmanned aerial vehicle group 2 may identify the actual load applied to each of the aircraft 21 and 22 by the loading device.

In some embodiments, the load may be measured by a sensor provided in each of the aircraft 21 and 22. As described above, each unmanned aerial vehicle may be provided with a sensor for measuring the load applied to the loading device fastening unit, and the measured value of the sensor may be transmitted to the master aircraft 21.

In some other embodiments, the load may be measured by a sensor provided in the loading device 30. As described above, the loading device 30 may be provided with sensors for detecting a load applied to each of the unmanned aerial vehicle fastening units physically connected to each of the unmanned aerial vehicles. The load applied to each fastening unit connected to each unmanned aerial vehicle may be measured by the sensors, and the measured value may be transferred to the master aircraft 21 by the loading device 30.

In step S43, the master aircraft 21 may receive battery level information from each of the aircraft 21 and 22.

In step S44, the master aircraft 21 may control the master aircraft 21 and/or the slave aircraft 22-1 to 22-3 included in the unmanned aerial vehicle group 2 based on the load information acquired in steps S41 and S42 or the battery level information acquired in step S43. For example, the master aircraft 21 and/or the slave aircraft 22-1 to 22-3 may be controlled so that the difference between the actual load applied to each aircraft and the target load is equal to or less than a predetermined threshold.

Hereinafter, it will be described in more detail with reference to FIGS. 25 to 27.

Figure 25:
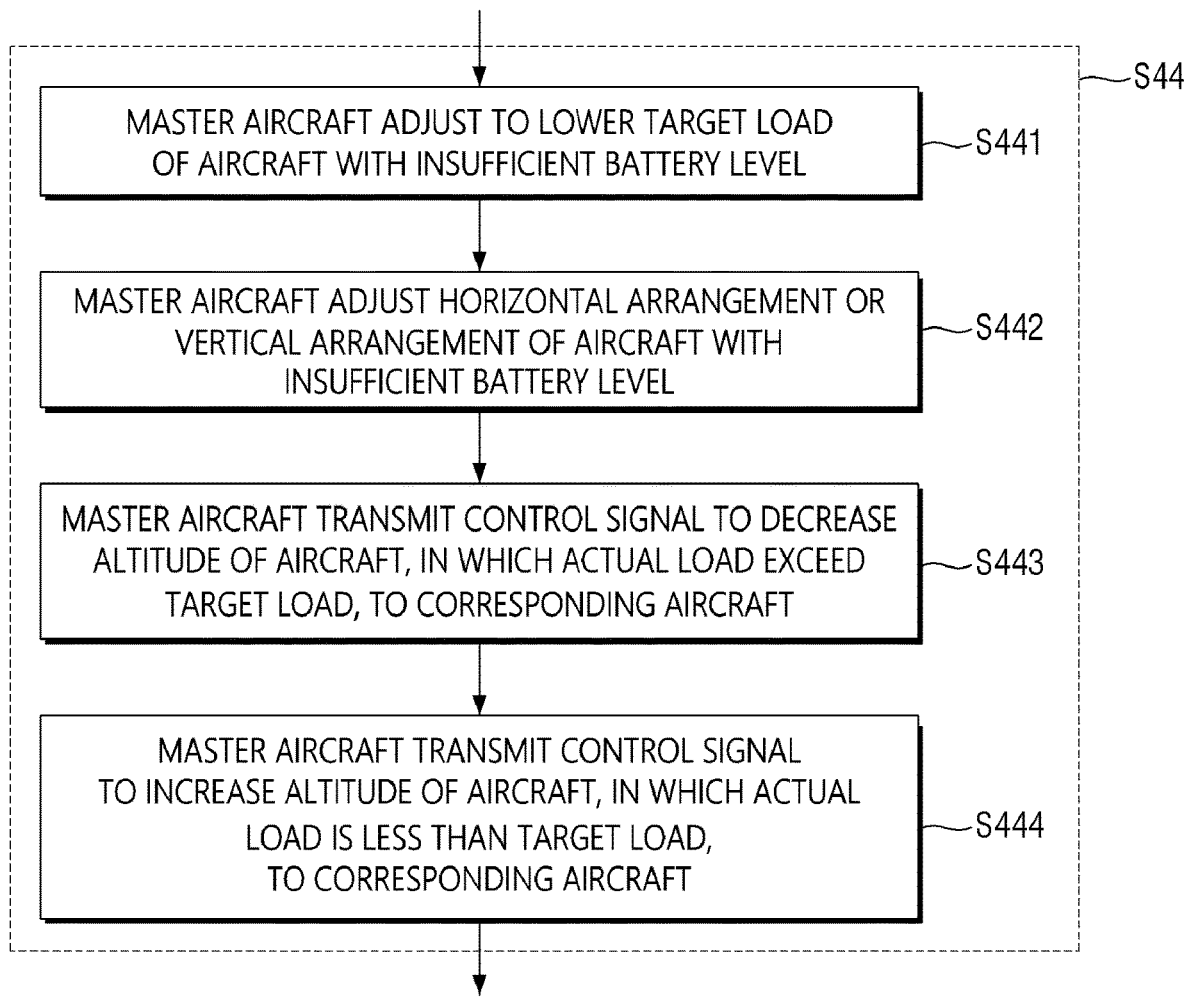
FIG. 25 is a diagram for describing in more detail a step, in which the master aircraft controls the flight of the unmanned aerial vehicle group based on load information or battery level information, among various steps described with reference to FIG. 24.

Referring to FIG. 25, in step S441, the master aircraft 21 may adjust to lower the target load of the aircraft, in which the battery level is less than the predetermined level. Subsequent actions following the adjustment of lowering the target load and their effects will be described later.

In step S442, the master aircraft 21 may adjust the vertical arrangement of the aircraft, in which the battery level is less than the predetermined level. It will be described with reference to FIG. 26.

Figure 26:
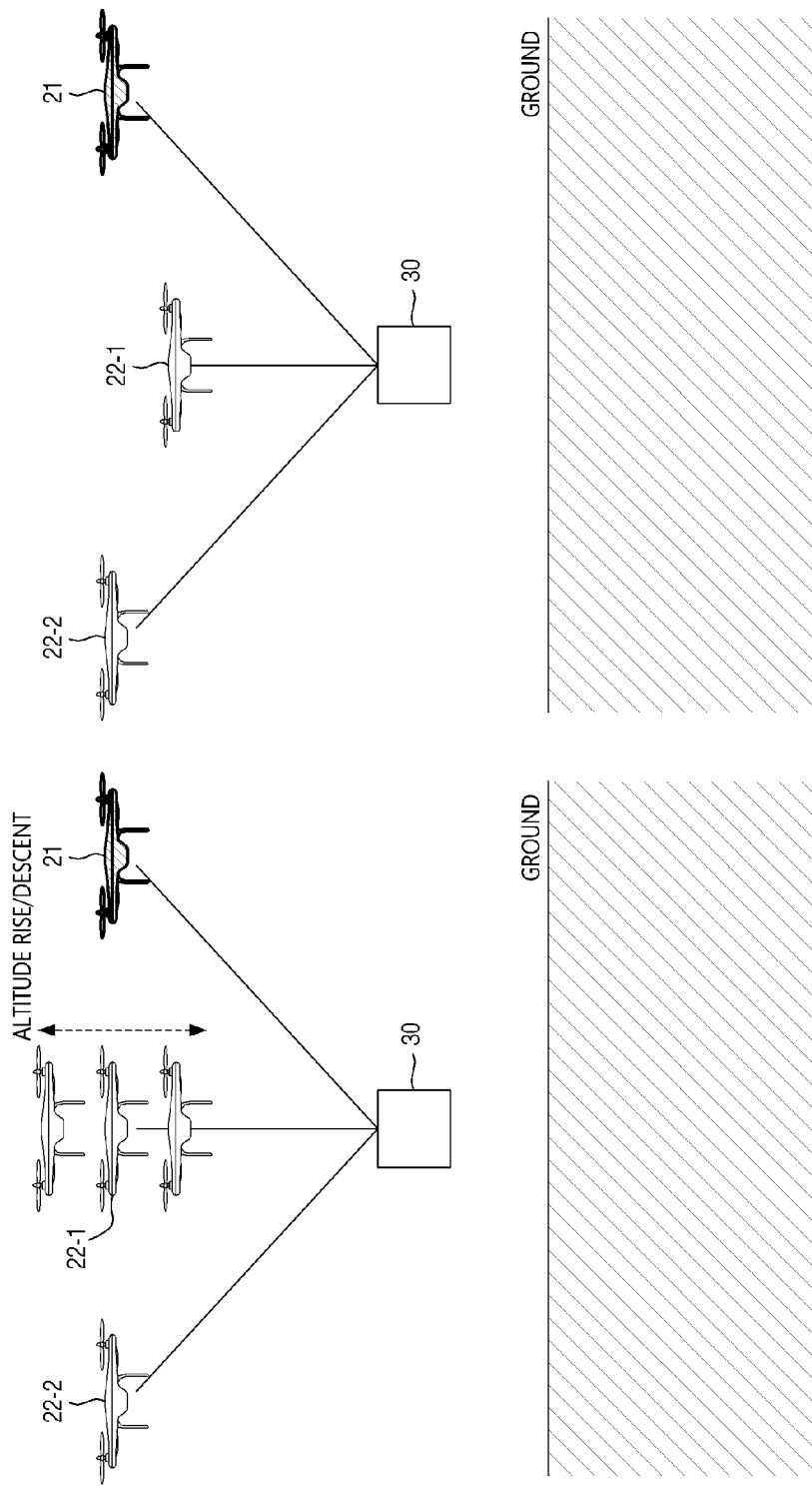
FIG. 26 is a diagram illustrating an exemplary view, in which the master aircraft adjusts the vertical arrangement of the aircraft based on load information or battery level information, according to some embodiments of the present disclosure.

Among the aircraft of the unmanned aerial vehicle group 2 shown in FIG. 26, when the battery level of the slave aircraft 22-1 is less than the predetermined level, by raising or lowering the altitude of the slave aircraft 22-1, vertical arrangement can be adjusted. Specifically, as shown in the right drawing of FIG. 26, the aircraft 22-1 with insufficient battery level sets the target altitude lower than the other aircraft 21 and 22-2, so that it can induce a relatively lower load to be applied than the load applied to the other aircraft. This action will ultimately reduce the energy consumption of the aircraft, allowing it to complete the flight over the planned distance for the transport of goods. In some embodiments, it is also possible to adjust lowering the altitude of the aircraft with insufficient battery level and raising the altitude of the other aircraft.

On the other hand, in step S442, the master aircraft 21 may adjust the horizontal arrangement of the aircraft with the battery level that is less than the predetermined level. It will be described with reference to FIG. 27.

Figure 27:
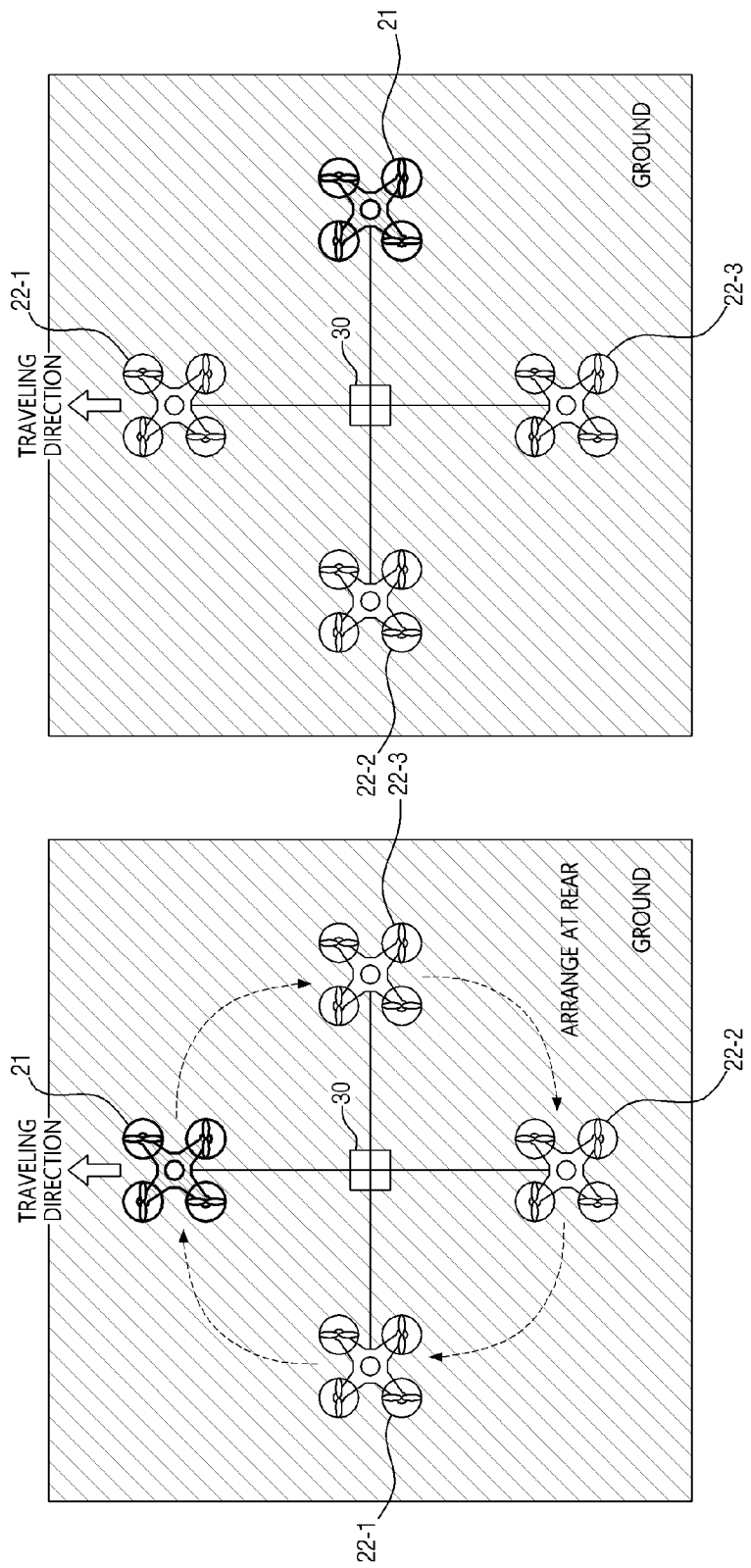
FIG. 27 is a diagram illustrating an exemplary view, in which the master aircraft adjusts the horizontal arrangement of the aircraft based on load information or battery level information, according to some embodiments of the present disclosure.

Among the aircraft of the unmanned aerial vehicle group 2 shown in FIG. 27, when the battery level of the slave aircraft 22-3 is less than the predetermined level, the horizontal arrangement may be adjusted so that the slave aircraft 22-3 is located at the rear with respect to the traveling direction of the unmanned aerial vehicle group 2 (direction towards the destination). Specifically, as shown in the right drawing of FIG. 27, the positions of the aircraft 21 and 22-1 to 22-3 may be rearranged so that the aircraft 22-3 with insufficient battery level is located at the rear with respect to the traveling direction.

In the case of the aircraft arranged at the front with respect to the traveling direction, not only the force for lifting the loading device 30 vertically upward, but also a force for towing the loading device 30 horizontally forward should be applied. On the other hand, in the case of the aircraft arranged at the rear with respect to the traveling direction, it is the same to lift the loading device 30 vertically upward, but does not tow the loading device 30 horizontally forward. Rather, the loading device 30 may tow the aircraft horizontally forward. Accordingly, the aircraft arranged at the rear with respect to the traveling direction can consume less energy than the aircraft arranged at the front with respect to the traveling direction.

Therefore, by arranging the aircraft 22-3 with insufficient battery level at the rear to ultimately reduce the energy consumption of the aircraft, it can make the flight of a scheduled distance for transporting goods be completed.

It will be described again with reference to FIG. 25.

In step S443, an aircraft, in which the load actually applied to each aircraft by the loading device 30 acquired in step S42 exceeds the target load of each aircraft acquired in step S41, is identified, and a control signal to decrease the altitude of such an aircraft may be transmitted to that aircraft. By reducing the altitude of the aircraft, it is possible to reduce the load applied to the aircraft by the loading device 30 and keep it so as not to exceed the target load.

In step S444, an aircraft, in which the load actually applied to each aircraft by the loading device 30 acquired in step S42 is less than the target load of each aircraft acquired in step S41, is identified, and a control signal to increase the altitude of such an aircraft may be transmitted to the aircraft. By increasing the altitude of the aircraft, it is possible to increase the load applied to the aircraft by the loading device 30 and keep it so as not to be less than the target load.

The above-described steps S443 and S444 may be performed by the master aircraft 21.

So far, with reference to FIGS. 24 to 27, a method of properly maintaining the load applied to each aircraft during collaborative delivery by the unmanned aerial vehicle group 2 according to some embodiments of the present disclosure has been described.

According to this embodiment, when the load applied to each aircraft is out of the range of the planned target load due to various factors occurring during the flight of the unmanned aerial vehicle group 2, by increasing or decreasing the altitude of the aircraft, it is possible to maintain and control the proper load to be applied to each aircraft.

In addition, according to this embodiment, when a case is found that the battery level of a specific aircraft is insufficient less than the predetermined battery level due to various factors occurring during the flight of the unmanned aerial vehicle group 2, various actions can be taken so that the battery consumption of the corresponding aircraft is reduced, and consequently, the flight of the scheduled distance is completed.

Specifically, by modifying the target load of the aircraft with insufficient battery level to be lower than the value set at the beginning of flight, the load of the loading device 30, in which the delivery target goods are loaded, shared by each aircraft of the unmanned aerial vehicle group 2 can be adjusted overall.

In addition, by adjusting the target altitude of the aircraft with insufficient battery level to be lower than the target altitude of other aircraft, it is possible to induce a relatively lower load to be applied to the aircraft with insufficient battery level.

In addition, by arranging the aircraft with insufficient battery level at the rear with respect to the traveling direction, energy consumed for towing the loading device 30 forward in the traveling direction can be reduced.

According to this embodiment, as the master aircraft 21 of the unmanned aerial vehicle group 2 performs the above control operation, the load applied to each aircraft during the flight of the unmanned aerial vehicle group 2 can be maintained at an appropriate level, as a result, the unmanned aerial vehicle group 2 is able to complete the scheduled flight.

Hereinafter, an unmanned aerial vehicle and a loading device according to some embodiments of the present disclosure will be described with reference to FIGS. 28 and 29.

Figure 28:
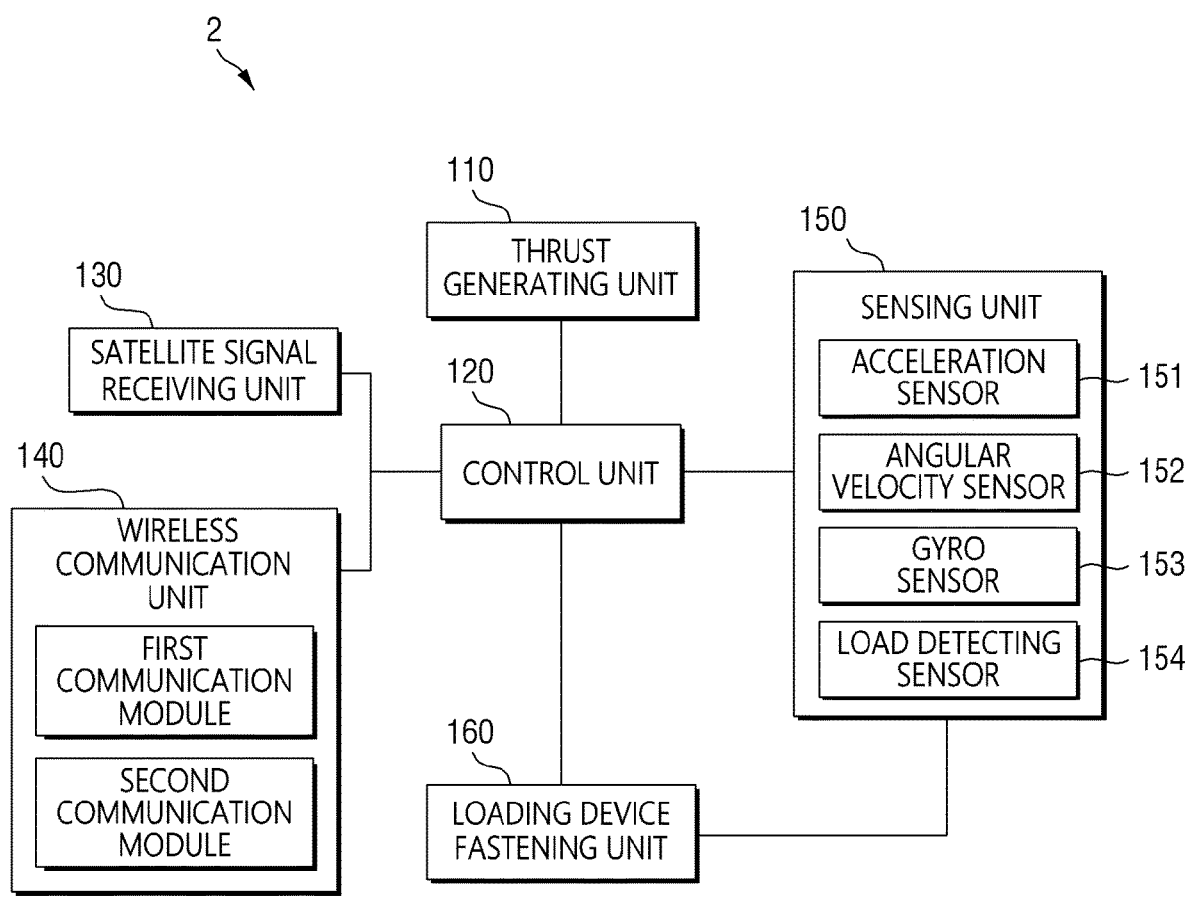
FIG. 28 is a block diagram of an unmanned aerial vehicle according to some embodiments of the present disclosure.

FIG. 28 is a block diagram of an unmanned aerial vehicle according to some embodiments of the present disclosure.

As shown in FIG. 28, each unmanned aerial vehicle such as the master aircraft 21 and the slave aircraft 22 forming the unmanned aerial vehicle group 2 may include a thrust generating unit 110, a control unit 120, a satellite signal receiving unit 130, a wireless communication unit 140, a sensing unit 150, and a loading device fastening unit 160, some of these components may be implemented in hardware or software, or may be implemented through a combination of hardware and software.

The thrust generating unit 110 may generate thrust in the unmanned aerial vehicle by driving one or more propellers provided in the unmanned aerial vehicle. The thrust generating unit 110 may drive the propeller or control the rotation speed based on the control signal received from the control unit 120. The thrust generating unit 110 may control the propeller rotational speed differently for each propeller, and may also control the propeller's propulsion direction to control the moving direction of the unmanned aerial vehicle.

The satellite signal receiving unit 130 may receive a plurality of satellite signals (so-called GPS signals) used for position measurement based on a global navigation satellite system (GNSS).

The wireless communication unit 140 may perform wireless communication with each of the control server 1, other unmanned aerial vehicles, and the loading device 30. The wireless communication unit 140 may include a first communication module and a second communication module for performing wireless communication based on different protocols.

The sensing unit 150 may include an acceleration sensor 151, an angular velocity sensor 152, a gyro sensor 153, a load detecting sensor 154, and the like. The sensing unit 150 may measure the posture of the unmanned aerial vehicle, that is, yaw, pitch, and roll through the acceleration sensor 151, the angular velocity sensor 152, and/or the gyro sensor 153. In addition, the sensing unit 150 may measure the X-axis acceleration, the Y-axis acceleration, and the Z-axis acceleration of the unmanned aerial vehicle using the sensors, respectively. Also, the sensing unit 150 may further include other sensors (not shown) such as a barometer, an ultrasonic sensor, and a distance measuring sensor. The sensing unit 130 may measure the current position and speed of the unmanned aerial vehicle by using one or more of a plurality of satellite signals received by the satellite signal receiving unit 130 and sensing data measured by the other sensors. Meanwhile, the sensing unit 150 may detect a load applied by the loading device 30 to the loading device fastening unit 160 to be described later through the load detecting sensor 154. Furthermore, the sensing unit 150 may detect whether or not the loading device fastening unit 160 to be described later is fasten to the loading device 30 through the load detecting sensor 154 or another separate sensor not shown.

The unmanned aerial vehicle may include a loading device fastening unit 160. The loading device fastening unit 160 may be connected to the loading device 30 through a connecting member such as a cable. The load detecting sensor 154 of the above-described sensing unit 150 may be connected or installed to the loading device fastening unit 160. The unmanned aerial vehicle may transport the delivery target goods loaded in the loading device 30 by lifting and moving the loading device 30 connected by a cable or the like through the loading device fastening unit 160 in the air.

The control unit 120 is a control means such as a microprocessor, and may control various components included in the unmanned aerial vehicle. The control unit 120 may continuously monitor the posture information including the roll, yaw, and pitch of the unmanned aerial vehicle, the current speed, the position, and the like through the sensing unit 150. The control unit 120 may monitor whether the loading device 30 is fastened and the load applied by the loading device 30 through the sensing unit 150. The control unit 120 may check the posture of the unmanned aerial vehicle through the sensing unit 150 and control the thrust generating unit 110 so that the posture of the unmanned aerial vehicle may be stably maintained. The control unit 120 may control the thrust generating unit 110 so that the unmanned aerial vehicle can autonomously fly to the destination based on the planned route information.

In an embodiment, the control unit 120 may acquire information about the movement and attributes of the delivery target goods through a communication session formed between the control server 1 or other unmanned aerial vehicle through the wireless communication unit 140. And, based on this, a process of forming an unmanned aerial vehicle group to participate in the delivery of the delivery target goods can be performed. Specifically, based on information on thrust performance, battery level, flight available distance, loadable load, etc. of a plurality of unmanned aerial vehicles included in the unmanned aerial vehicle pool, and information on the weight, size, shape, etc. of the delivery target goods, it may perform a process of selecting unmanned aerial vehicles that can be used for a joint collaboration delivery.

In one embodiment, the control unit 120 may receive a movement starting command from the control server 1 through the wireless communication unit 140, and switches the operation mode of the unmanned aerial vehicle to a standalone mode, a master mode, or a slave mode, and receive the readiness state information of the slave aircraft of the unmanned aerial vehicle group and the state information of the loading device through the wireless session, and determine the completion of the flight readiness based on the state information, and transmit a takeoff readiness signal to the control server 1 through the wireless session, and when receiving a takeoff authorization command from the control server 1, it may transmit a takeoff authorization command to the slave aircraft through a wireless session.

In one embodiment, the control unit 120 may acquire a reference route for delivery of goods from the control server 1 through the wireless communication unit 140, and perform a process for controlling the flight of the aircraft included in the unmanned aerial vehicle group so that the goods loading device 30 transported by the unmanned aerial vehicle moves along the reference route. Specifically, the control unit 120 may receive the current actual position of the loading device 30 from the loading device 30 through the wireless communication unit 140, and determine whether the difference between the target position and the actual position of the loading device 30 exceeds a threshold, and generate a signal for controlling the flight of each of the unmanned aerial vehicles connected to the loading device 30 so that the difference between the target position and the actual position of the loading device 30 is less than or equal to a threshold.

In one embodiment, the control unit 120 may acquire the target load associated with each aircraft included in the unmanned aerial vehicle group from the control server 1 through the wireless communication unit 140, receive information about the actual load applied to each aircraft by the loading device 30, determine whether a difference between an actual load applied to each aircraft and a target load of each aircraft exceeds a threshold, and generate a signal for controlling the flight of each of the unmanned aerial vehicles connected to the loading device 30 so that the difference between the actual load applied to each aircraft and the target load of each aircraft is less than or equal to a threshold.

Figure 29:
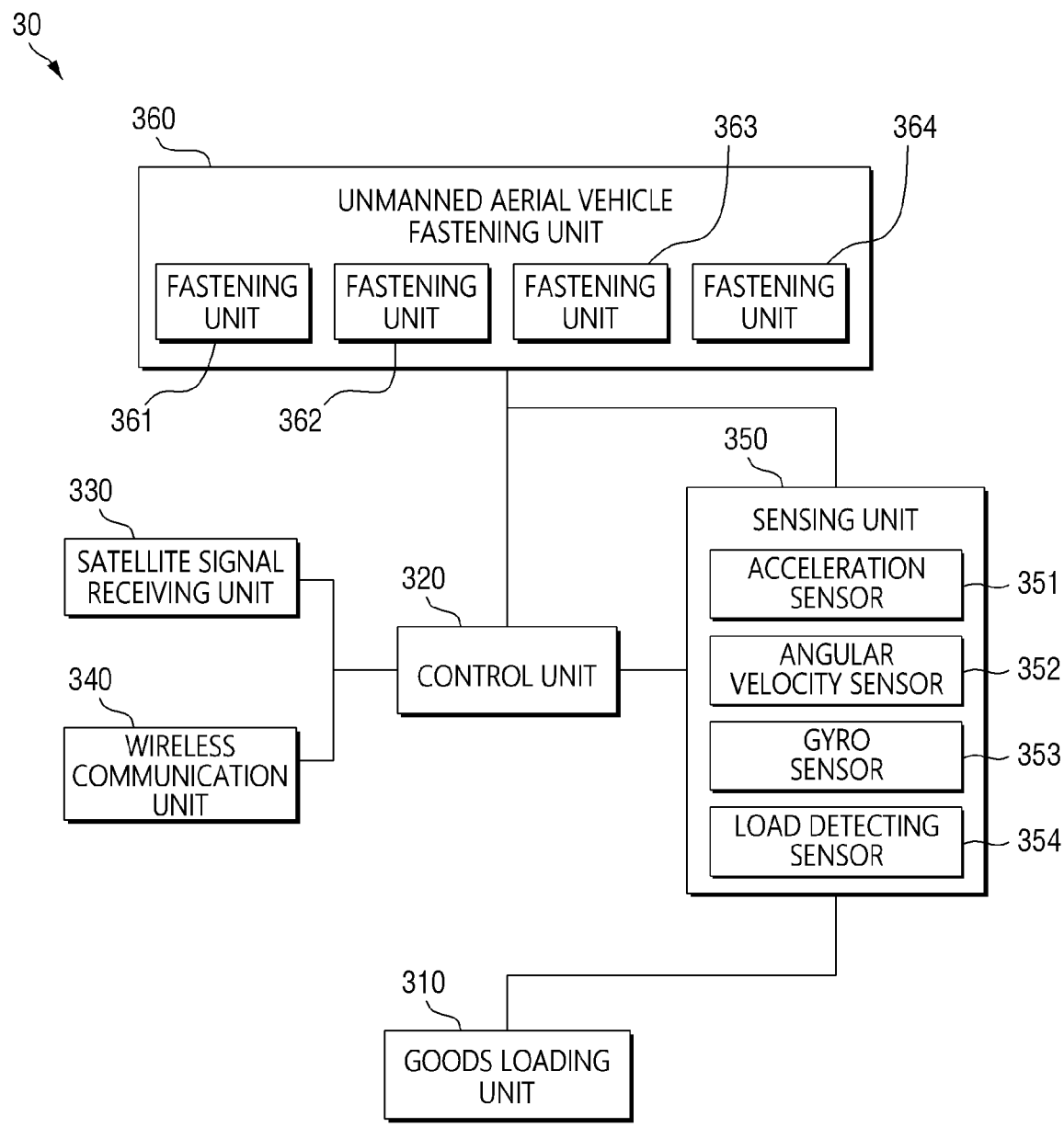
FIG. 29 is a block diagram of a loading device according to some embodiments of the present disclosure.

FIG. 29 is a block diagram of a loading device according to some embodiments of the present disclosure.

As shown in FIG. 29, the loading device 30 may include a goods loading unit 310, a control unit 320, a satellite signal receiving unit 330, a wireless communication unit 340, a sensing unit 350, and an unmanned aerial vehicle fastening unit 360, and some of these components may be implemented in hardware or software, or may be implemented through a combination of hardware and software.

The goods loading unit 310 is a member, in which a delivery target goods to be loaded by the loading device 30 and transported by the unmanned aerial vehicle group is loaded. The goods loading unit 310 may have a loading space therein, and may include means for safely fixing the loading target goods. Also, the goods loading unit 310 may include a sensor for detecting the weight of the goods loaded therein.

The satellite signal receiving unit 330 may receive a plurality of satellite signals (a.k.a. GPS signals) used for position measurement based on a global navigation satellite system (GNSS).

The wireless communication unit 340 may perform wireless communication with the control server 1 and the unmanned aerial vehicle. Although not shown, the wireless communication unit 340 may include a first communication module and a second communication module for performing wireless communication based on different protocols.

The sensing unit 350 may include an acceleration sensor 351, an angular velocity sensor 352, a gyro sensor 353, a load detecting sensor 354, and the like. The sensing unit 350 may measure the posture of the loading device 30, that is, yaw, pitch, and roll through the acceleration sensor 351, the angular velocity sensor 352, and/or the gyro sensor 353. In addition, the sensing unit 350 may measure the X-axis acceleration, the Y-axis acceleration, and the Z-axis acceleration of the loading device 30 by using the sensors, respectively. Also, the sensing unit 350 may further include other sensors (not shown) such as a barometer, an ultrasonic sensor, and a distance measuring sensor. The sensing unit 330 may measure the current position and speed of the loading device 30 by using one or more of a plurality of satellite signals received by the satellite signal receiving unit 330 and sensing data measured by the other sensors. Meanwhile, the sensing unit 350 may detect a load applied to the unmanned aerial vehicle fastening unit 360 to be described later through the load detecting sensor 354. Furthermore, the sensing unit 350 may detect whether each of the fastening units 361 to 364 of the unmanned aerial vehicle fastening unit 360 is fastened with the corresponding unmanned aerial vehicle through the load detecting sensor 354 or other separate sensor not shown.

The loading device 30 may include an unmanned aerial vehicle fastening unit 360. The unmanned aerial vehicle fastening unit 360 may include a plurality of fastening units 361 to 364 for fastening with a plurality of unmanned aerial vehicles. The unmanned aerial vehicle fastening unit 360 may be connected to the unmanned aerial vehicle through a connecting member such as a cable. The load detecting sensor 354 of the above-described sensing unit 350 may be connected or installed to the unmanned aerial vehicle fastening unit 360. The magnitude of the force (e.g., tension) applied to each of the plurality of fastening units 361 to 364 respectively fastened with the plurality of unmanned aerial vehicles may be measured through the load detecting sensor 354 or other separate sensor not shown. The loading device 30 may be connected to one or more unmanned aerial vehicles via a cable or the like through the unmanned aerial vehicle fastening unit 360, and may be lifted in the air and moved to a destination.

The control unit 320 is a control means such as a microprocessor, and may control various components included in the loading device 30.

The control unit 320 may monitor, through the sensing unit 350, posture information including roll, yaw, and pitch of the unmanned aerial vehicle, current speed, position, and the like.

The control unit 320, through the sensing unit 350, may monitor whether the fastening units 361 to 364 are fastened with one or more unmanned aerial vehicles, and the magnitude of the force (e.g., tension) applied to each of the fastening units 361 to 364.

The control unit 320 may check the position and posture of the loading device 30 through the sensing unit 350 and provide an appropriate signal to the unmanned aerial vehicle group 2 so that the position and posture of the loading device are properly maintained. Specifically, the control unit 320 may provide the information on the various states of the loading device 30 (position, acceleration, angular velocity, posture, whether each fastening unit is fastened, and load or tension applied to each fastening unit) detected or identified through a satellite signal receiving unit 330 and the sensing unit to the control server 1 and/or the master aircraft 21 of the unmanned aerial vehicle group 2 through the wireless communication unit 340.

The technical features of the present disclosure described so far may be embodied as computer readable codes on a computer readable medium. The computer readable medium may be, for example, a removable recording medium (CD, DVD, Blu-ray disc, USB storage device, removable hard disk) or a fixed recording medium (ROM, RAM, computer equipped hard disk). The computer program recorded on the computer readable medium may be transmitted to other computing device via a network such as internet and installed in the other computing device, thereby being used in the other computing device.

In the above description, it is described that all the components constituting the embodiments of the present disclosure are combined or operated as one, but the technical features of the present disclosure are not limited to these embodiments. That is, within the scope of the present disclosure, all of the components may be selectively combined and operated in one or more combinations.

Although the operations are shown in a specific order in the drawings, those skilled in the art will appreciate that many variations and modifications can be made to the embodiments without substantially departing from the principles of the present disclosure. Therefore, the disclosed preferred embodiments of the disclosure are used in a generic and descriptive sense only and not for purposes of limitation. The scope of protection of the present disclosure should be interpreted by the following claims, and all technical ideas within the scope equivalent thereto should be construed as being included in the scope of the technical idea defined by the present disclosure.

What is claimed is:

1. A method for delivering goods through an unmanned aerial vehicle group including a plurality of aircraft respectively connected to delivery target goods comprising:
   identifying, by a master aircraft of the unmanned aerial vehicle group, an actual load applied to each of the aircraft by the goods while the unmanned aerial vehicle group is in flight for delivering the goods; and
   controlling the unmanned aerial vehicle group by the master aircraft to adjust the actual load applied to each of the aircraft.

2. The method of claim 1 further comprises,
   obtaining a target load associated with each aircraft of the unmanned aerial vehicle group by the master aircraft before the unmanned aerial vehicle group initiates the flight for delivering the goods,
   wherein the target load associated with each of the aircraft is determined based on weight of the delivery target goods and thrust performance of each of the aircraft.

3. The method of claim 1 further comprises,
   receiving, by the master aircraft, battery level information from each aircraft of the unmanned aerial vehicle group; and
   adjusting, by the master aircraft, a target load associated with at least one aircraft of the unmanned aerial vehicle group based on the battery level information.

4. The method of claim 1 further comprises,
   receiving, by the master aircraft, battery level information from each aircraft of the unmanned aerial vehicle group; and
   adjusting, by the master aircraft, a vertical arrangement of at least one aircraft of the unmanned aerial vehicle group based on the battery level information.

5. The method of claim 4, wherein adjusting the vertical arrangement of the at least one aircraft comprises,
   decreasing an altitude of an aircraft based on determination that the aircraft has insufficient battery.

6. The method of claim 1 further comprises,
   receiving, by the master aircraft, battery level information from each aircraft of the unmanned aerial vehicle group; and
   adjusting, by the master aircraft, a horizontal arrangement of at least one aircraft of the unmanned aerial vehicle group based on the battery level information.

7. The method of claim 6, wherein adjusting the horizontal arrangement of the at least one aircraft comprises,
   adjusting relative positions between aircrafts of the unmanned aerial vehicle group so that an aircraft having insufficient battery is located at rear with respect to a traveling direction of the unmanned aerial vehicle group.

8. The method of claim 1, wherein controlling the unmanned aerial vehicle group by the master aircraft to adjust the actual load applied to each of the aircraft comprises,
   transmitting, by the master aircraft, a control signal to decrease an altitude to a first aircraft among the unmanned aerial vehicle group,
   wherein the first aircraft is an aircraft to which an actual load applied by the goods exceeds a target load, during the flight for delivering the goods.

9. The method of claim 1, wherein controlling the unmanned aerial vehicle group by the master aircraft to adjust the actual load applied to each of the aircraft comprises,
   transmitting, by the master aircraft, a control signal to increase an altitude to the second aircraft among the unmanned aerial vehicle group;
   wherein the second aircraft is an aircraft to which an actual load applied by the goods is less than a target load during the flight for delivering the goods.

10. The method of claim 1, wherein the delivery target goods are loaded inside a loading device,
    wherein the loading device is connected to each aircraft of the unmanned aerial vehicle group.

11. The method of claim 10 further comprises,
    obtaining, by the master aircraft, a reference route for delivery of the goods;
    receiving, by the master aircraft, flight state information of a loading device, the loading device being connected to the unmanned aerial vehicle group during the flight for delivering the goods; and
    controlling, by the master aircraft, based on the received flight state information of the loading device, flight of the unmanned aerial vehicle group so that the loading device moves along the reference route.

12. The method of claim 11, wherein the received flight state information of the loading device includes a current actual position of the loading device,
    wherein controlling the flight of the unmanned aerial vehicle group comprises,
    identifying, by the master aircraft, a current target position of the loading device determined based on the reference route; and
    generating, by the master aircraft, a signal to control flight of each aircraft connected to the loading device so that a difference between a current target position of the loading device and a current actual position of the loading device is less than or equal to a threshold during the flight for delivering the goods.

13. The method of claim 12, wherein generating the signal to control the flight of each of the aircraft comprises,
    for each aircraft of the unmanned aerial vehicle group,
    identifying, by the master aircraft, a current target position of each of the aircraft, wherein the current target position of each of the aircraft is specified as a relative position with respect to a current target position of the loading device; and
    transmitting, by the master aircraft, a signal to control flight of each of the aircraft so that a difference between a current target position of each of the aircraft and a current actual position of each of the aircraft is less than or equal to a threshold during the flight for delivering the goods.

14. The method of claim 11, wherein the received flight state information of the loading device includes a current position, acceleration, angular velocity, and posture information of the loading device according to a global navigation satellite system.

15. The method of claim 11, wherein the received flight state information of the loading device includes information on whether each aircraft of the unmanned aerial vehicle group is fastened to the loading device.

16. The method of claim 15, wherein the received flight state information of the loading device includes magnitude of force applied to a connecting member for connecting each aircraft to the loading device, respectively.

17. An unmanned aerial vehicle comprising:
a thrust generating unit for generating thrust to enable flight of an unmanned aerial vehicle;
a load measuring unit for measuring a load applied by a goods loading device transported by the unmanned aerial vehicle;
a wireless communication unit for forming a wireless session with other unmanned aerial vehicles included in an unmanned aerial vehicle group; and
a control unit,
wherein the control unit acquires a target load associated with each aircraft included in the unmanned aerial vehicle group, receives information on an actual load applied to each of the aircraft by the loading device through the wireless communication unit, and controls the unmanned aerial vehicle group so that a difference between an actual load applied to each of the aircraft and a target load of each of the aircraft is less than or equal to a threshold.

* * * * *